(12) United States Patent
Hirokane et al.

(10) Patent No.: US 6,463,016 B1
(45) Date of Patent: Oct. 8, 2002

(54) MAGNETO-OPTICAL STORAGE MEDIUM HAVING IN-PLANE MAGNETIZED LAYERS

(75) Inventors: Junji Hirokane, Nara; Noboru Iwata, Tenri, both of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/493,655

(22) Filed: Jan. 28, 2000

(30) Foreign Application Priority Data

Jan. 29, 1999 (JP) .......................................... 11-022887

(51) Int. Cl.[7] .............................................. G11B 11/00
(52) U.S. Cl. ............ 369/13.4; 369/13.38; 428/694 MM
(58) Field of Search ........................... 369/13.4, 13.38, 369/13.35, 13.39, 13.42, 13.41; 428/694 ML, 64.3, 694 GR, 694 RE, 694 MM

(56) References Cited

U.S. PATENT DOCUMENTS

| 5,498,485 A | | 3/1996 | Nakayama et al. |
| 5,714,251 A | | 2/1998 | Ohta et al. |
| 5,738,765 A | | 4/1998 | Ohta et al. |
| 5,774,429 A | * | 6/1998 | Nishimura .................... 369/13 |
| 5,879,822 A | * | 3/1999 | Okada .................. 428/694 RE |
| 5,939,187 A | * | 8/1999 | Hirokane et al. .............. 369/13 |
| 5,982,715 A | * | 11/1999 | Mori et al. .................... 369/13 |
| 6,187,460 B1 | * | 2/2001 | Nishimura .......... 428/694 MM |
| 6,307,816 B1 | * | 10/2001 | Nishimura .................... 369/13 |

FOREIGN PATENT DOCUMENTS

| JP | 06-295479 | 10/1994 |
| JP | A9320134 | 12/1997 |
| JP | 10-255344 | 9/1998 |

* cited by examiner

Primary Examiner—Tan Dinh

(57) ABSTRACT

A magneto-optical recording medium according to the present invention includes a reproducing layer having in-plane magnetization at room temperature and shifting to have perpendicular magnetization at temperatures at and above a critical temperature, a first in-plane magnetized layer having a Curie temperature in the vicinity of the critical temperature, a second in-plane magnetized layer having a Curie temperature higher than that of the first in-plane magnetized layer, and a recording layer made of a perpendicularly magnetized film, provided in that order.

37 Claims, 13 Drawing Sheets

↑ DIRECTION OF MOMENT OF TRANSITION METAL SUB-LATTICE

⇧ TOTAL MAGNETIZATION

▨ MAGNETIC FLUX LEAKAGE

↑ DIRECTION OF MOMENT OF TRANSITION METAL SUB-LATTICE

⇧ TOTAL MAGNETIZATION

▌ MAGNETIC FLUX LEAKAGE

↑ DIRECTION OF MOMENT OF TRANSITION METAL SUB-LATTICE

⇧ TOTAL MAGNETIZATION

▨ MAGNETIC FLUX LEAKAGE

↑ DIRECTION OF MOMENT OF TRANSITION
   METAL SUB-LATTICE

⇧ TOTAL MAGNETIZATION

▨ MAGNETIC FLUX LEAKAGE

↑ DIRECTION OF MOMENT OF TRANSITION METAL SUB-LATTICE

⇧ TOTAL MAGNETIZATION

▨ MAGNETIC FLUX LEAKAGE

↑ DIRECTION OF MOMENT OF TRANSITION METAL SUB-LATTICE

⇧ TOTAL MAGNETIZATION

▨ MAGNETIC FLUX LEAKAGE

↑ DIRECTION OF MOMENT OF TRANSITION METAL SUB-LATTICE

⇑ TOTAL MAGNETIZATION

▤ MAGNETIC FLUX LEAKAGE

MAGNETO-OPTICAL STORAGE MEDIUM HAVING IN-PLANE MAGNETIZED LAYERS

FIELD OF THE INVENTION

The present invention relates to a magneto-optical recording medium such as a magneto-optical disk, magneto-optical tape, a magneto-optical card, etc., for use in a magneto-optical recording and reproducing device.

BACKGROUND OF THE INVENTION

One type of re-writable optical memory medium conventionally implemented for actual use is a magneto-optical disk using a magneto-optical memory medium. In such a magneto-optical disk, a light beam projected by a semiconductor laser is condensed and projected onto the magneto-optical recording medium, thereby raising the temperature of a localized area of the magneto-optical recording medium to perform recording and erasure. Accordingly, recorded information is reproduced by condensing and projecting onto the magneto-optical recording medium a light beam of a strength insufficient to perform recording and erasure, and distinguishing a state of polarization of light reflected therefrom.

However, in this type of magneto-optical recording medium, as the diameter of recorded bits of recorded magnetic domains and the interval between recorded bits becomes small in comparison with the diameter of the light beam spot, reproducing characteristics deteriorate. This is because adjacent recording bits fall within the light beam spot condensed on a target recording bit, thus making it impossible to distinguish and reproduce the individual recorded bits.

One magneto-optical recording medium which has been proposed to solve the foregoing problem is a magneto-optical recording medium structured of a reproducing layer having in-plane magnetization at room temperature and shifting to perpendicular magnetization at temperatures at and above a critical temperature, an in-plane magnetized layer having a Curie temperature in the vicinity of the critical temperature, a non-magnetic intermediate layer, and a recording layer made of a perpendicular magnetized film, for recording information (disclosed in Japanese Unexamined Patent Publication No. 9-320134/1997 (Tokukaihei 9-320134), published on Dec. 12, 1997).

In the foregoing conventional magneto-optical recording medium, the reproducing layer has in-plane magnetization at temperatures below the critical temperature. Accordingly, at temperatures below the critical temperature, the in-plane magnetization of the reproducing layer forms a mask, so that recorded magnetic domain information recorded in the recording layer is not copied to the reproducing layer, and thus the recorded magnetic domain information is not reproduced. At temperatures at and above the critical temperature, however, the reproducing layer shifts to perpendicular magnetization. Accordingly, at temperatures at and above the critical temperature, recorded magnetic domain information is copied to the reproducing layer, and recorded magnetic domain information is reproduced.

With the foregoing structure, even if adjacent recorded bits fall within the light beam spot condensed on the reproducing layer, the individual recorded bits can be distinguished and reproduced, as long as reproducing power of the light beam and the critical temperature at which the reproducing layer shifts to perpendicular magnetization are set appropriately. Consequently, it is possible to reproduce information recorded at high density, i.e., to perform ultra-high resolution reproducing.

The following will explain, with reference to FIG. 13, an ultra-high resolution magneto-optical recording medium, which is a magneto-optical recording medium capable of reproducing information recorded at high density. FIG. 13 is an explanatory drawing showing the principle of ultra-high resolution reproducing operations in a conventional magneto-optical recording medium.

The foregoing conventional ultra-high resolution magneto-optical recording medium is structured of a reproducing layer 101 having in-plane magnetization at room temperature and perpendicular magnetization at temperatures at and above a critical temperature, an in-plane magnetized layer 102 having a Curie temperature in the vicinity of the critical temperature, a non-magnetic intermediate layer 103, and a recording layer 104 made of a perpendicular magnetized film having a compensation temperature in the vicinity of room temperature.

Reproducing is performed by condensing and projecting a light beam 105 onto the reproducing layer 101 side of the ultra-high resolution magneto-optical recording medium. Condensing and projecting the light beam 105 onto the ultra-high resolution magneto-optical recording medium forms therein a temperature distribution having a Gaussian distribution corresponding to an intensity distribution of the light beam 105. In accordance with this temperature distribution, the reproducing layer 101 shifts from in-plane to perpendicular magnetization, forming a domain 106 having a temperature at or above the critical temperature and having perpendicular magnetization. Within domains of the reproducing layer 101 retaining in-plane magnetization, an in-plane magnetization mask is formed, and thus a reproducing signal is not produced.

In the domain 106 where the reproducing layer 101 has shifted to perpendicular magnetization, on the other hand, total magnetization is directed in the same direction (up or down) as the direction of magnetic flux leaking from the recording layer 104. Accordingly, the direction of magnetization of the recording layer 104 is copied to the reproducing layer 101, and ultra-high resolution reproducing can be realized.

Here, the in-plane magnetized layer 102, whose Curie temperature is in the vicinity of the critical temperature, is exchange-coupled with the reproducing layer 101, and is provided in order to strengthen the in-plane magnetization mask in domains of the reproducing layer 101 whose temperature is less than the critical temperature.

As discussed above, in the foregoing conventional ultra-high resolution magneto-optical recording medium, it is preferable to reproduce only the information of the domain 106 having perpendicular magnetization, where the reproducing layer 101 has a temperature at or above the critical temperature.

Here, in order to give the reproducing layer 101 characteristics whereby it has in-plane magnetization at room temperature and shifts to perpendicular magnetization with rising temperature, the composition of the reproducing layer 101, in contrast to a compensation composition in which moment of rare earth (RE) and transition metal (TM) sub-lattices are the same size in a temperature range at which reproducing is performed, must be an RE-rich composition having more RE sub-lattice moment. In the reproducing layer 101, the orientation of the TM sub-lattice moment and that of total magnetization are parallel, but are directed in opposite directions, i.e., they are anti-parallel.

The recording layer 104, on the other hand, is made of an RE-TM alloy having a compensation temperature at room temperature, and in the temperature range at which reproducing is performed, the TM sub-lattice moment is larger than the RE sub-lattice moment. Accordingly, in the recording layer 104, the orientation of the TM sub-lattice moment and that of total magnetization are parallel, and are directed in the same direction (up or down).

However, in the foregoing conventional ultra-high resolution magneto-optical recording medium, the total magnetization of the in-plane magnetized layer 102 gradually decreases as temperature rises, and in the vicinity of the domain 106, it is difficult for the in-plane magnetized layer 102 to strengthen the in-plane magnetization mask of the reproducing layer 101. Consequently, in the vicinity of the domain 106, even at temperatures below the critical temperature, the reproducing layer 101 is influenced by leaking magnetic flux produced by the recording layer 104, and the orientation of the magnetization of the reproducing layer 101 tilts with respect to the surface of the layer. Accordingly, when reproducing information from the domain 106, information is simultaneously reproduced from adjacent domains, even though they are below the critical temperature, and this impairs reproducing resolution.

Given that in recent years there is a need for even larger recording capacity, the foregoing magneto-optical recording medium disclosed in Japanese Unexamined Patent Publication No. 9-320134/1997, as discussed above, provides insufficient in-plane magnetization masking effect, and thus cannot provide sufficient reproducing resolution.

SUMMARY OF THE INVENTION

It is an object of the present invention to improve reproducing resolution of a magneto-optical recording medium so as to enable reproducing of individual recorded bits with high signal quality, even when information is recorded at high density.

In order to attain the foregoing object, a magneto-optical recording medium according to the present invention comprises a reproducing layer having in-plane magnetization at room temperature and shifting to have perpendicular magnetization at temperatures at and above a critical temperature, an in-plane magnetized layer made of an in-plane magnetized film, and a recording layer made of a perpendicularly magnetized film, provided in that order, wherein the in-plane magnetized layer includes a first in-plane magnetized layer having a Curie temperature in the vicinity of the critical temperature, and a second in-plane magnetized layer having a Curie temperature which is higher than the Curie temperature of the first in-plane magnetized layer; with the first in-plane magnetized layer being provided toward the reproducing layer, and the second in-plane magnetized layer being provided toward the recording layer.

With the foregoing structure, the in-plane magnetized layer provided between the reproducing layer and the recording layer includes a first in-plane magnetized layer and a second in-plane magnetized layer. The first in-plane magnetized layer is provided toward the reproducing layer, and has a Curie temperature in the vicinity of the critical temperature of the reproducing layer. The second in-plane magnetized layer, on the other hand, is provided toward the recording layer, and has a Curie temperature higher than that of the first in-plane magnetized layer.

At temperatures below the Curie temperature of the first in-plane magnetized layer, the first and second in-plane magnetized layers are exchange coupled with each other. Consequently, the reproducing layer is exchange coupled with the second in-plane magnetized layer via the first in-plane magnetized layer.

Here, as the first in-plane magnetized layer is heated to its Curie temperature in the vicinity of the critical temperature of the reproducing layer, its magnetization decreases, and thus the force holding the reproducing layer in its in-plane magnetized state weakens. However, at this time, the second in-plane magnetized layer, which has a Curie temperature higher than the Curie temperature of the first in-plane magnetized layer, i.e., higher than the critical temperature of the reproducing layer, has sufficiently large magnetization. Accordingly, since the reproducing layer is, via the first in-plane magnetized layer, exchange coupled with the second in-plane magnetized layer having a sufficiently large magnetization, the magnetization of the reproducing layer is firmly fixed in an in-plane state, even in domains having temperatures close to the critical temperature.

When, on the other hand, the temperature of the first in-plane magnetized layer exceeds its Curie temperature, the reproducing layer is no longer exchange coupled to the second in-plane magnetization layer, and the reproducing layer shifts to perpendicular magnetization, and the direction of magnetization (up or down) of the recording layer is copied to the reproducing layer and reproduced.

In this way, stronger in-plane magnetization forms a mask in the reproducing layer, and leakage of magnetic flux from the recording layer can be completely shut out, even in domains of the reproducing layer in the vicinity of the domain with perpendicular magnetization, which have temperatures close to the critical temperature.

Consequently, even with a small recorded bit diameter and a small recorded bit interval, it is possible to obtain a reproducing signal with sufficiently high resolution, i.e., to improve reproducing resolution in magnetic ultra-high resolution reproducing.

Further, a magneto-optical recording medium according to the present invention may be structured so as to comprise a reproducing layer having in-plane magnetization at room temperature and shifting to have perpendicular magnetization at temperatures at and above a critical temperature, an in-plane magnetized layer made of an in-plane magnetized film, and a recording layer made of a perpendicularly magnetized film, provided in that order, wherein Curie temperature of the in-plane magnetized layer changes continuously in the direction of layer thickness, such that Curie temperature at an interface with the recording layer is higher than Curie temperature at an interface with the reproducing layer.

With the foregoing structure, Curie temperature of the in-plane magnetized layer between the reproducing and recording layers changes continuously in the direction of thickness of the layer, so that Curie temperature at the interface with the recording layer is higher than Curie temperature at the interface with the reproducing layer, and in domains whose temperature is less than the Curie temperature, the in-plane magnetized layer is exchange coupled to the reproducing layer.

Accordingly, during reproducing, as that part of the in-plane magnetized layer adjacent to the reproducing layer is heated to its Curie temperature, magnetization decreases, and the force holding the reproducing layer to an in-plane magnetized state weakens. However, since, as mentioned above, the in-plane magnetized layer has a Curie temperature distribution in the direction of layer thickness, with increasing distance from the reproducing layer and increasing proximity to the recording layer, Curie temperature increases, and magnetization of the in-plane magnetized layer is larger. For this reason, the reproducing layer is exchange coupled to that part of the in-plane magnetized layer provided farthest from the reproducing layer (on the recording layer side).

As that part of the in-plane magnetized layer adjacent to the reproducing layer is heated above its Curie temperature, the reproducing layer is no longer exchange coupled to that part of the in-plane magnetized layer, and the reproducing layer shifts to perpendicular magnetization, and the direction of magnetization (up or down) of the recording layer is copied to the reproducing layer and reproduced.

In this way, stronger in-plane magnetization forms a mask in the reproducing layer, and leakage of magnetic flux from the recording layer can be completely shut out, even in domains of the reproducing layer in the vicinity of the domain with perpendicular magnetization, which have temperatures close to the critical temperature.

Consequently, even with a small recorded bit diameter and a small recorded bit interval, it is possible to obtain a reproducing signal with sufficiently high resolution, i.e., to improve reproducing resolution in magnetic ultra-high resolution reproducing.

Further, it is preferable if the foregoing magneto-optical recording medium is further provided with a nonmagnetic intermediate layer between the in-plane magnetized layer and the recording layer.

With this structure, exchange coupling between the in-plane magnetized layer and the recording layer is shut out by the non-magnetic intermediate layer.

If the non-magnetic intermediate layer is not provided, the in-plane magnetization of the in-plane magnetized layer is subject to influence by exchange coupling acting between the in-plane magnetized layer and the recording layer, and it is necessary to make the in-plane magnetized layer thicker to avoid this influence. For this reason, by shutting out exchange coupling between the in-plane magnetized layer and the recording layer by providing, as in the present invention, a non-magnetic intermediate layer made of a non-magnetic material, the in-plane magnetized layer can be made thinner.

Consequently, decreased thickness of the in-plane magnetized layer makes it possible to improve recording sensitivity.

Further, it is preferable if the foregoing magneto-optical recording medium is also provided with a reflective layer between the non-magnetic intermediate layer and the recording layer, and if the non-magnetic intermediate layer is transparent.

With this structure, by providing the reflective layer between the non-magnetic intermediate layer and the recording layer, an interference effect produced in the multi-layered structure results in increased Kerr rotation angle. Further, the reproducing light beam which has passed through the reproducing layer, the in-plane magnetized layer, and the transparent non-magnetic intermediate layer is reflected by the reflective layer.

Accordingly, reproducing of unnecessary signals from the recording layer can be more effectively prevented.

Incidentally, Kerr rotation angle is an angle of rotation of a plane of polarization of light, which rotates according to the direction of magnetization of a magnetic body when the light is reflected from a surface of or passes through the magnetic body.

Consequently, it is possible to reproduce only the information copied to the reproducing layer, thus improving both ultra-high resolution reproducing characteristics and reproducing signal quality.

Additional objects, features, and strengths of the present invention will be made clear by the description below. Further, the advantages of the present invention will be evident from the following explanation in reference to the drawings.

DESCRIPTION OF THE EMBODIMENTS

[First Embodiment ]

Figure 1:
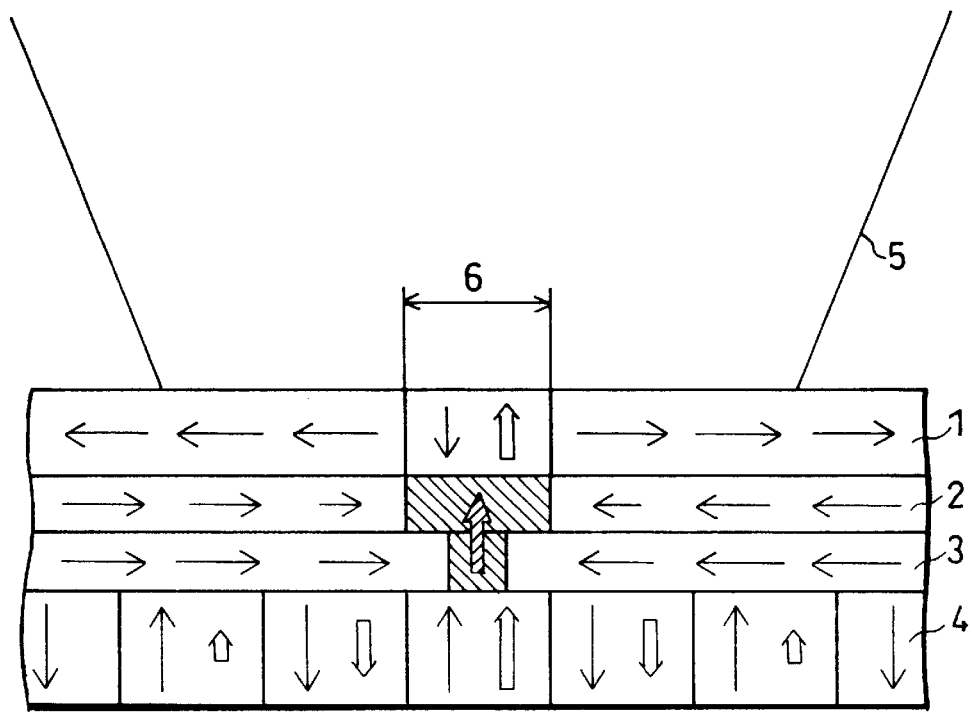
FIG. 1 is an explanatory drawing illustrating the principle of reproducing in a magneto-optical recording medium according to a first embodiment of the present invention.

The following will explain a first embodiment of the present invention with reference to FIG. 1.

First, the principle of ultra-high resolution reproducing operations in the magneto-optical recording medium according to the present embodiment will be explained. FIG. 1 is an explanatory drawing showing magnetization states of the magneto-optical recording medium according to the present embodiment.

The magneto-optical recording medium according to the present embodiment is made up of a reproducing layer 1, a first in-plane magnetized layer 2, a second in-plane magnetized layer 3, and a recording layer 4, provided in that order. The reproducing layer 1 has in-plane magnetization at room temperature and perpendicular magnetization at temperatures at and above a critical temperature. The first in-plane magnetized layer 2 has a Curie temperature $T_1$ in the vicinity of the critical temperature. The second in-plane magnetized layer 3 has a Curie temperature $T_2$ which is higher than the Curie temperature $T_1$. The recording layer 4 is made of a perpendicularly magnetized film having a compensation temperature in the vicinity of room temperature.

Here, since the second in-plane magnetized layer 3 is exchange coupled with the recording layer 4, it is subject to a force from the recording layer 4 which attempts to give the in-plane magnetized layer 3 the same perpendicular magnetization as the recording layer 4. However, the thickness of the second in-plane magnetized layer 3 is set such that the second in-plane magnetized layer 3 has completely in-plane magnetization, at least on the side thereof toward the interface between the first and second in-plane magnetized layers 2 and 3.

During reproducing, a mask of in-plane magnetization is formed in domains of the reproducing layer 1 which have in-plane magnetization, and in a perpendicularly magnetized domain 6 having perpendicular magnetization, information recorded in the recording layer 4 is copied to the reproducing layer 1.

Here, when the first in-plane magnetized layer 2 is heated to the vicinity of its Curie temperature $T_1$ by condensing and projecting a light beam 5 during reproducing, the magnetization of the first in-plane magnetized layer 2 gradually becomes smaller. However, the first in-plane magnetized layer 2 is exchange coupled with the second in-plane magnetized layer 3, which has a higher Curie temperature $T_2$. For this reason, in a temperature range below the Curie temperature $T_1$ of the first in-plane magnetized layer 2, the reproducing layer 1 is exchange coupled to the second in-plane magnetized layer 3 via the first in-plane magnetized layer 2.

Since the second in-plane magnetized layer 3 has a Curie temperature $T_2$ which is higher than that of the first in-plane magnetized layer 2, the second in-plane magnetized layer 3 has a sufficiently large magnetization even at temperatures close to the critical temperature at which the reproducing layer 1 shifts from in-plane to perpendicular magnetization. Since the reproducing layer 1 is, via the first in-plane magnetized layer 2, exchange coupled with the second in-plane magnetized layer 3 having a sufficiently large magnetization, the magnetization of the reproducing layer 1 is firmly fixed in an in-plane state, even in domains close to the perpendicularly magnetized domain 6, which have temperatures close to the critical temperature.

Next, in a domain of the first in-plane magnetized layer 2 whose temperature exceeds the Curie temperature $T_1$, i.e., in the perpendicularly magnetized domain 6, the reproducing layer 1 is no longer exchange coupled to the second in-plane magnetization layer 3. Consequently, in the perpendicularly magnetized domain 6, the reproducing layer 1 easily shifts to perpendicular magnetization, and the recorded information of the recording layer 4 is copied to the reproducing layer 1, thus realizing reproducing. Accordingly, the magneto-optical recording medium according to the present embodiment is able to realize reproducing of only the recorded information in the perpendicularly magnetized domain 6, i.e., able to realize ultra-high resolution reproducing.

As discussed above, the magneto-optical recording medium according to the present embodiment is provided with a second in-plane magnetized layer 3 having a Curie temperature $T_2$ which is higher than the Curie temperature $T_1$ of the first in-plane magnetized layer 2. Accordingly, in domains where the temperature of the first in-plane magnetized layer 2 is below its Curie temperature $T_1$ and the reproducing layer 1 is exchange coupled with the second in-plane magnetized layer 3 via the first in-plane magnetized layer 2, the in-plane magnetization mask of the reproducing layer 1 is strengthened.

In domains where, on the other hand, the temperature of the first in-plane magnetized layer 2 is above its Curie temperature $T_1$ and the reproducing layer 1 is not exchange coupled with the second in-plane magnetized layer 3, the reproducing layer 1 shifts to perpendicular magnetization, forming the perpendicularly magnetized domain 6, which can be reproduced. Thus the recorded information recorded in the perpendicularly magnetized domain 6 is reproduced.

In this way, stronger in-plane magnetization forms a mask in the reproducing layer 1, even in domains of the reproducing layer 1 in the vicinity of the perpendicularly magnetized domain 6, which have temperatures close to the critical temperature. Consequently, the influence of leakage of magnetic flux from the recording layer 4 can be completely shut out, and high reproducing resolution can be realized.

[Second Embodiment]

Figure 2:
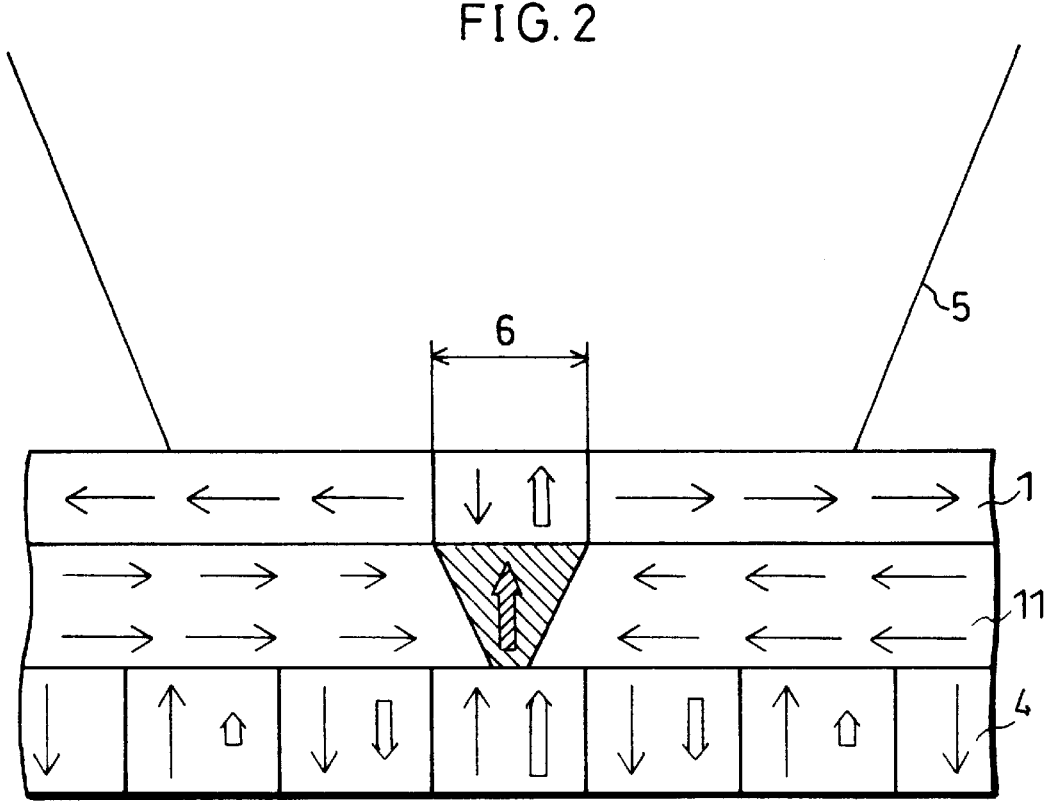
FIG. 2 is an explanatory drawing illustrating the principle of reproducing in a magneto-optical recording medium according to a second embodiment of the present invention.

The following will explain a second embodiment of the present invention with reference to FIG. 2. For ease of explanation, members having the same functions as those shown in the drawings pertaining to the first embodiment above will be given the same reference symbols, and explanation thereof will be omitted here.

First, the principle of ultra-high resolution reproducing operations in the magneto-optical recording medium according to the present embodiment will be explained. FIG. 2 is an explanatory drawing showing magnetization states of the magneto-optical recording medium according to the present embodiment.

The magneto-optical recording medium according to the present embodiment, which performs ultra-high resolution reproducing, is made up of a reproducing layer 1, a third in-plane magnetized layer 11, and a recording layer 4. The reproducing layer 1 has in-plane magnetization at room temperature and perpendicular magnetization at above a critical temperature. In the third in-plane magnetized layer 11, Curie temperature changes continuously in the direction of layer thickness, such that a Curie temperature $T_3$ at an interface with the reproducing layer 1 is in the vicinity of the critical temperature, and a Curie temperature $T_4$ at an interface with the recording layer 4 is higher than the Curie temperature $T_3$. The recording layer 4 is made of a perpendicularly magnetized film having a compensation temperature in the vicinity of room temperature.

During reproducing, in domains where the reproducing layer 1 has in-plane magnetization, the reproducing layer 1 is exchange coupled to the third in-plane magnetized layer 11, thus forming a mask of in-plane magnetization. In the perpendicularly magnetized domain 6 where the reproducing layer 1 has perpendicular magnetization, recorded information recorded in the recording layer 4 is copied to the reproducing layer 1. In this way, it is possible to realize reproducing of only the recorded information in the perpendicularly magnetized domain 6, i.e., to realize ultra-high resolution reproducing.

Here, during reproducing, as that part of the third in-plane magnetized layer 11 toward the interface with the reproducing layer 1 is heated to the Curie temperature $T_3$, magnetization decreases, and the force holding the reproducing layer 1 in an in-plane magnetized state weakens. However, since the third in-plane magnetized layer 11 has a Curie temperature distribution in the direction of layer thickness, with increasing distance from the reproducing layer 1 and increasing proximity to the recording layer 4, Curie temperature increases, and magnetization of the third in-plane magnetized layer 11 is larger. For this reason, the reproducing layer 1 is held in an in-plane magnetized state by the magnetization of that part of the third in-plane magnetized layer 11 provided toward the recording layer 4.

When the temperature of the reproducing layer 1 is below the critical temperature, the reproducing layer 1 and the third in-plane magnetized layer 11 are exchange coupled. Since the third in-plane magnetized layer 11 has a Curie temperature distribution in the direction of layer thickness, even in a temperature range in which the temperature of that part of the third in-plane magnetized layer 11 in the vicinity of the reproducing layer 1 approaches the Curie temperature $T_3$, thus decreasing magnetization, the reproducing layer 1 can be exchange coupled with the sufficiently large magnetization of the part of the third in-plane magnetized layer 11 away from the reproducing layer 1 (toward the interface with the recording layer 4). Consequently, the reproducing layer 1 can be firmly held to an in-plane magnetized state, even in domains of the reproducing layer 1 in the vicinity of the perpendicularly magnetized domain 6, which have temperatures close to the critical temperature.

In domains where the part of the third in-plane magnetized layer 11 adjacent to the reproducing layer 1 is heated above the Curie temperature $T_3$, the third in-plane magnetized layer 11 is no longer exchange coupled to the reproducing layer 1, and the reproducing layer easily shifts to perpendicular magnetization.

Accordingly, in the perpendicularly magnetized domain 6, the recorded information recorded in the recording layer 4 is copied to the reproducing layer 1, and reproducing can be realized. In this way, the optical recording medium according to the present embodiment is able to realize reproducing of only the recorded information in the perpendicularly magnetized domain 6, i.e., able to realize ultra-high resolution reproducing.

As discussed above, by providing a third in-plane magnetized layer 11 in which Curie temperature changes continuously in the direction of layer thickness, such that a Curie temperature $T_3$ at the interface with the reproducing layer 1 is in the vicinity of the critical temperature, and a Curie temperature $T_4$ at the interface with the recording layer 4 is higher than the Curie temperature $T_3$, the in-plane magnetization of the reproducing layer 1 is sufficiently strengthened, even in domains of the reproducing layer 1 in the vicinity of the perpendicularly magnetized domain 6, which have temperatures close to the critical temperature. Accordingly, it is possible to realize high reproducing resolution.

[Third Embodiment]

Figure 3:
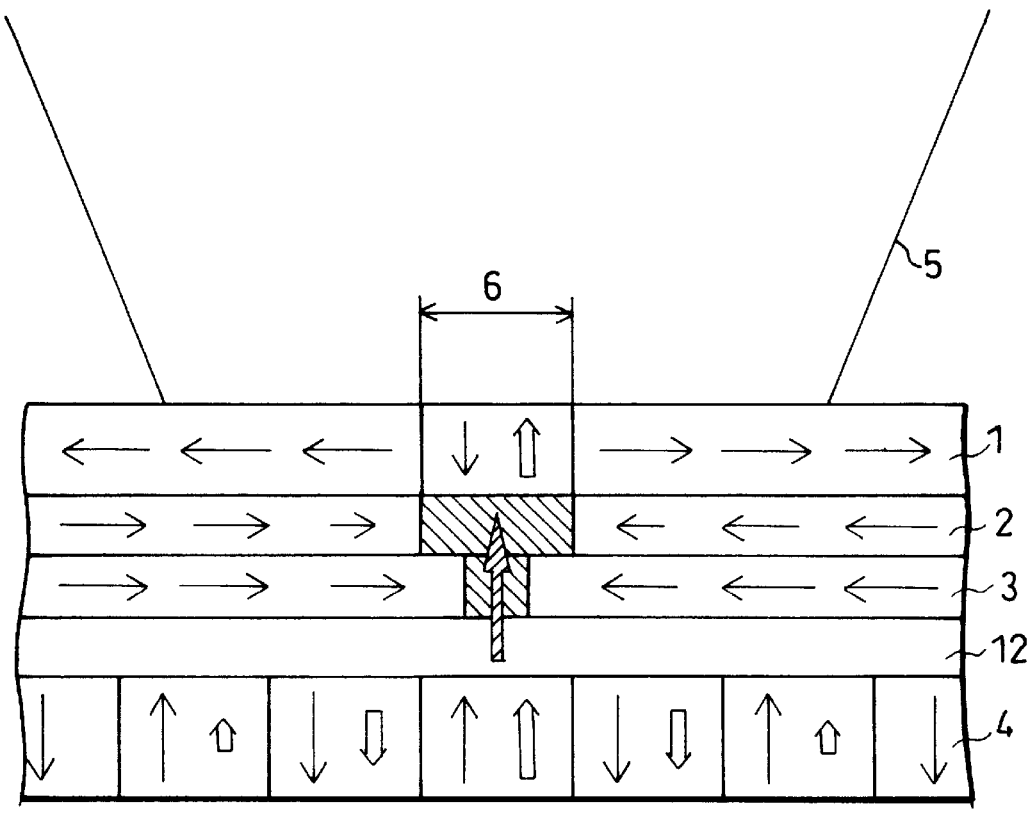
FIG. 3 is an explanatory drawing illustrating the principle of reproducing in a magneto-optical recording medium according to a third embodiment of the present invention.

The following will explain a third embodiment of the present invention with reference to FIG. 3. For ease of explanation, members having the same functions as those shown in the drawings pertaining to the first and second embodiments above will be given the same reference symbols, and explanation thereof will be omitted here.

First, the principle of ultra-high resolution reproducing operations in the magneto-optical recording medium according to the present embodiment will be explained. FIG. 3 is an explanatory drawing showing magnetization states of the magneto-optical recording medium according to the present embodiment, which performs ultra-high resolution reproducing operations.

The magneto-optical recording medium according to the present embodiment is made up of a reproducing layer 1, a first in-plane magnetized layer 2, a second in-plane magnetized layer 3, a non-magnetic intermediate layer 12, and a recording layer 4. The reproducing layer 1 has in-plane magnetization at room temperature and perpendicular magnetization at above a critical temperature. The first in-plane magnetized layer 2 has a Curie temperature $T_1$ in the vicinity of the critical temperature, and the second in-plane magnetized layer 3 has a Curie temperature $T_2$ which is higher than the Curie temperature $T_1$ of the first in-plane magnetized layer 2. The non-magnetic intermediate layer 12 is made of a non-magnetic film. The recording layer 4 is made of a perpendicularly magnetized film having a compensation temperature in the vicinity of room temperature.

As can be seen from the above, the magneto-optical recording medium according to the present embodiment is structured as the magneto-optical recording medium according to the first embodiment above, except that the non-magnetic intermediate layer 12 is provided between the second in-plane magnetized layer 3 and the recording layer 4.

In the magneto-optical recording medium according to the first embodiment above, since exchange coupling acts between the second in-plane magnetized layer 3 and the recording layer 4, it is necessary to make the second in-plane magnetized layer 3 thicker in order to make it a completely in-plane magnetized layer. However, in the present embodiment, since the non-magnetic intermediate layer 12 is provided between the second in-plane magnetized layer 3 and the recording layer 4, there is no exchange coupling between these two layers. Accordingly, in the magneto-optical recording medium according to the present embodiment, the second in-plane magnetized layer 3 can be made thinner, and this reduction in film thickness makes it possible to improve recording sensitivity.

As discussed above, in the magneto-optical recording medium according to the present embodiment, as in that of the first embodiment above, by providing a second in-plane magnetized layer 3 having a Curie temperature $T_2$ higher than the Curie temperature $T_1$ of the first in-plane magnetized layer 2, in domains whose temperature is below the Curie temperature $T_1$ of the first in-plane magnetized layer 2, where the reproducing layer 1 is exchange coupled to the second in-plane magnetized layer 3 via the first in-plane magnetized layer 2, the in-plane magnetization mask of the reproducing layer 1 is strengthened. Further, in a domain whose temperature is above the Curie temperature $T_1$ of the first in-plane magnetized layer 2, where there is no exchange coupling between the reproducing layer 1 and the second in-plane magnetized layer 3, the reproducing layer 1 shifts to perpendicular magnetization, forming the perpendicularly magnetized domain 6, from which recorded information is reproduced.

By this means, the in-plane magnetization mask of the reproducing layer 1 is sufficiently strengthened, even in domains of the reproducing layer 1 in the vicinity of the perpendicularly magnetized domain 6, which have temperatures close to the critical temperature. Accordingly, it is possible to realize high reproducing resolution.

Further, by providing the non-magnetic intermediate layer 12 between the second in-plane magnetized layer 3 and the recording layer 4, exchange coupling between these two layers can be shut out. Accordingly, the second in-plane magnetized layer 3 can be made thinner, and recording sensitivity can be improved.

[Fourth Embodiment]

Figure 4:
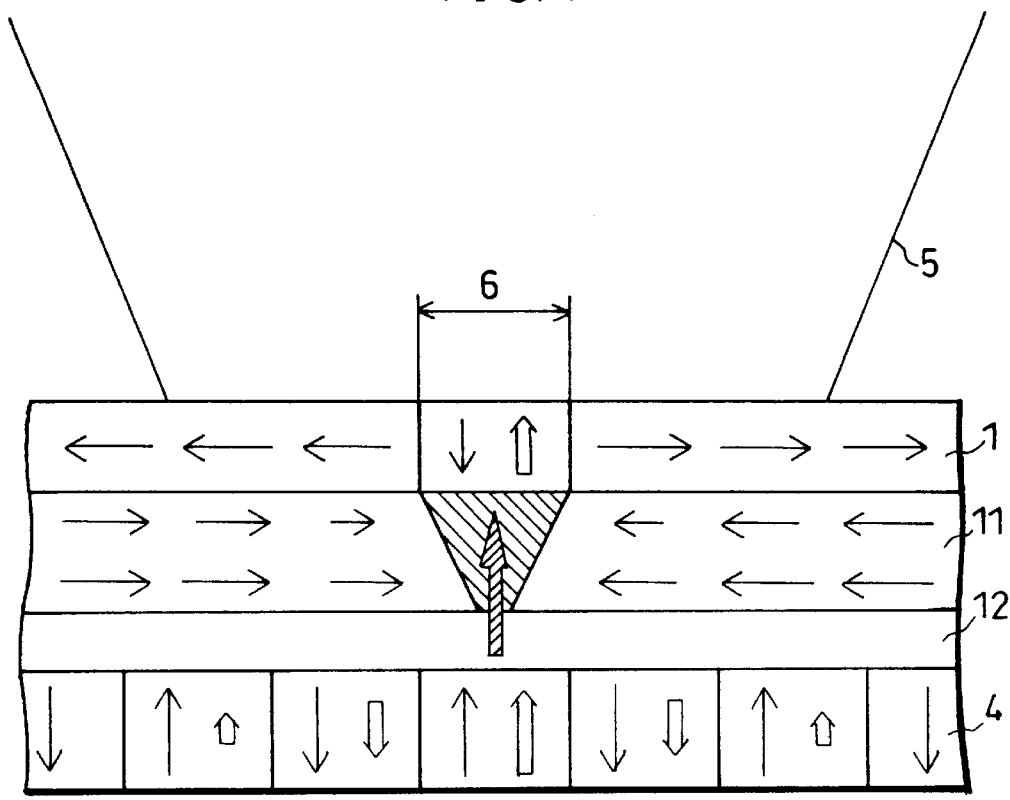
FIG. 4 is an explanatory drawing illustrating the principle of reproducing in a magneto-optical recording medium according to a fourth embodiment of the present invention.

The following will explain a fourth embodiment of the present invention with reference to FIG. 4. For ease of explanation, members having the same functions as those shown in the drawings pertaining to the first through third embodiments above will be given the same reference symbols, and explanation thereof will be omitted here.

First, the principle of ultra-high resolution reproducing operations in the magneto-optical recording medium according to the present embodiment will be explained. FIG. 4 is an explanatory drawing showing magnetization states of the magneto-optical recording medium according to the present embodiment.

The magneto-optical recording medium according to the present embodiment is made up of a reproducing layer 1, a third in-plane magnetized layer 11, a non-magnetic intermediate layer 12, and a recording layer 4. The reproducing layer 1 has in-plane magnetization at room temperature and perpendicular magnetization at temperatures at above a critical temperature. In the third in-plane magnetized layer 11, Curie temperature changes continuously in the direction of layer thickness, such that a Curie temperature $T_3$ at an interface with the reproducing layer 1 is in the vicinity of the critical temperature, and a Curie temperature $T_4$ at an interface with the non-magnetic intermediate layer 12 is higher than the Curie temperature $T_3$. The non-magnetic intermediate layer 12 is made of a non-magnetic film. The recording layer 4 is made of a perpendicularly magnetized film having a compensation temperature in the vicinity of room temperature.

As can be seen from the above, the magneto-optical recording medium according to the present embodiment is structured as the magneto-optical recording medium according to the second embodiment above, except that the non-magnetic intermediate layer 12 is provided between the third in-plane magnetized layer 11 and the recording layer 4.

In the magneto-optical recording medium according to the second embodiment above, since exchange coupling acts between the third in-plane magnetized layer 11 and the recording layer 4, it is necessary to make the third in-plane magnetized layer 11 thicker in order to make it a completely in-plane magnetized layer. However, in the present embodiment, since the non-magnetic intermediate layer 12 is provided between the third in-plane magnetized layer 11 and the recording layer 4, there is no exchange coupling between these two layers. Accordingly, in the magneto-optical recording medium according to the present embodiment, the third in-plane magnetized layer 11 can be made thinner, and this reduction in film thickness makes it possible to improve recording sensitivity.

As discussed above, the magneto-optical recording medium according to the present embodiment, like that of the second embodiment above, is provided with a third in-plane magnetized layer 11 in which Curie temperature changes continuously in the direction of layer thickness, such that a Curie temperature $T_3$ at the interface with the reproducing layer 1 is in the vicinity of the critical temperature, and a Curie temperature $T_4$ at the interface with the non-magnetic intermediate layer 12 is higher than the Curie temperature $T_3$.

By this means, the in-plane magnetization mask of the reproducing layer 1 is sufficiently strengthened, even in domains of the reproducing layer 1 in the vicinity of the perpendicularly magnetized domain 6, which have temperatures close to the critical temperature. Accordingly, it is possible to realize high reproducing resolution.

Further, by providing the non-magnetic intermediate layer 12 between the third in-plane magnetized layer 11 and the recording layer 4, exchange coupling between these two layers can be shut out. Accordingly, the third in-plane magnetized layer 11 can be made thinner, and recording sensitivity can be improved.

[Fifth Embodiment]

Figure 5:
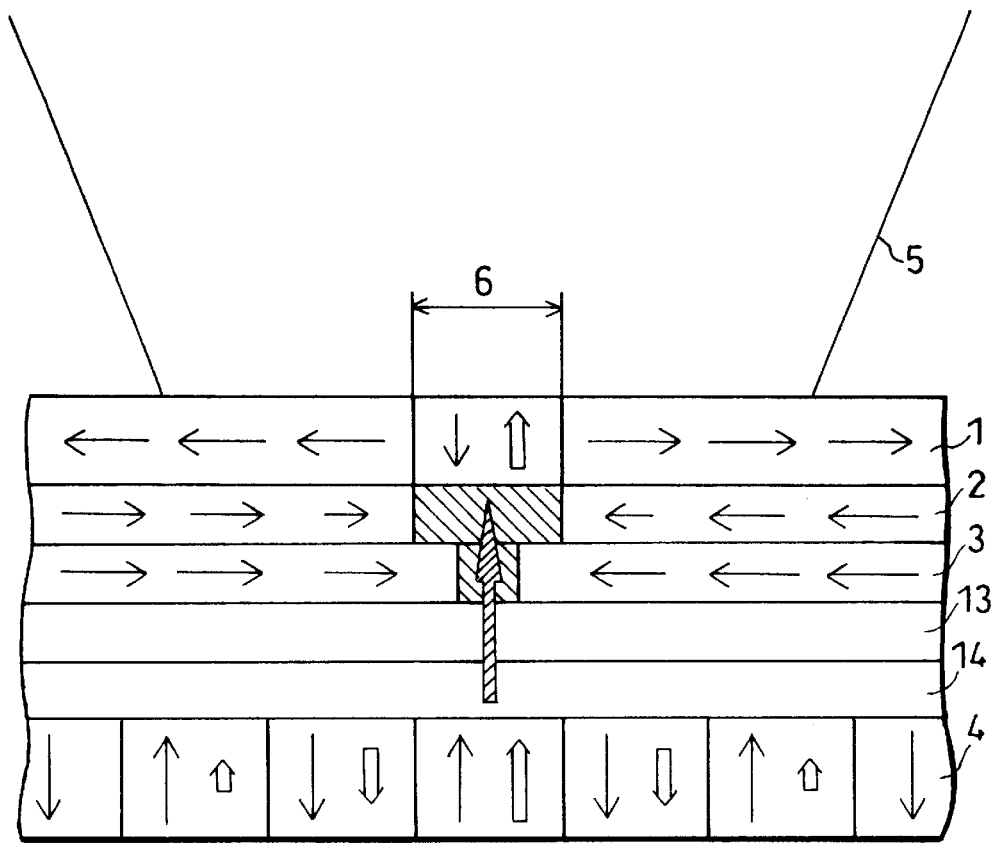
FIG. 5 is an explanatory drawing illustrating the principle of reproducing in a magneto-optical recording medium according to a fifth embodiment of the present invention.

The following will explain a fifth embodiment of the present invention with reference to FIG. 5. For ease of explanation, members having the same functions as those shown in the drawings pertaining to the first through fourth embodiments above will be given the same reference symbols, and explanation thereof will be omitted here.

First, the principle of ultra-high resolution reproducing operations in the magneto-optical recording medium according to the present embodiment will be explained. FIG. 5 is an explanatory drawing showing magnetization states of the magneto-optical recording medium according to the present embodiment, which performs ultra-high resolution reproducing operations.

The magneto-optical recording medium according to the present embodiment is made up of a reproducing layer 1, a first in-plane magnetized layer 2, a second in-plane magnetized layer 3, a non-magnetic intermediate layer 13, a reflective layer 14, and a recording layer 4, provided in that order. The reproducing layer 1 has in-plane magnetization at room temperature and perpendicular magnetization at temperatures at and above a critical temperature. The first in-plane magnetized layer 2 has a Curie temperature $T_1$ in the vicinity of the critical temperature, and the second in-plane magnetized layer 3 has a Curie temperature $T_2$ which is higher than the Curie temperature $T_1$ of the first in-plane magnetized layer 2. The non-magnetic intermediate layer 13 is made of a non-magnetic film which is a transparent dielectric body. The recording layer 4 is made of a perpendicularly magnetized film having a compensation temperature in the vicinity of room temperature.

In the magneto-optical recording medium according to the third embodiment above, by providing the non-magnetic intermediate layer 12 between the second in-plane magnetized layer 3 and the recording layer 4, exchange coupling between these two layers was shut out, and it was possible to reduce the thickness of the second in-plane magnetized layer 3. However, in the magneto-optical recording medium according to the present embodiment, by replacing the non-magnetic intermediate layer 12 with the non-magnetic intermediate layer 13, which is a transparent dielectric body, and by further providing the reflective layer 14, an interference effect produced in the multi-layered structure results in increased Kerr rotation angle. Further, since the light beam 5 is reflected by the reflective layer 14, reproducing of signals from the recording layer 4 can be more effectively prevented, and it is possible to reproduce only the information copied to the reproducing layer 1. Consequently, ultra-high resolution reproducing characteristics can be improved.

As discussed above, by providing the magneto-optical recording medium according to the present embodiment with a reflective layer 14 between the non-magnetic intermediate layer 13 and the recording layer 4, in addition to the effects obtained with the structure according to the third embodiment above, it is possible to completely shut out leakage of magnetic flux from the recording layer 4 in the vicinity of the perpendicularly magnetized domain 6, and thus to further improve reproducing resolution.

[Sixth Embodiment]

Figure 6:
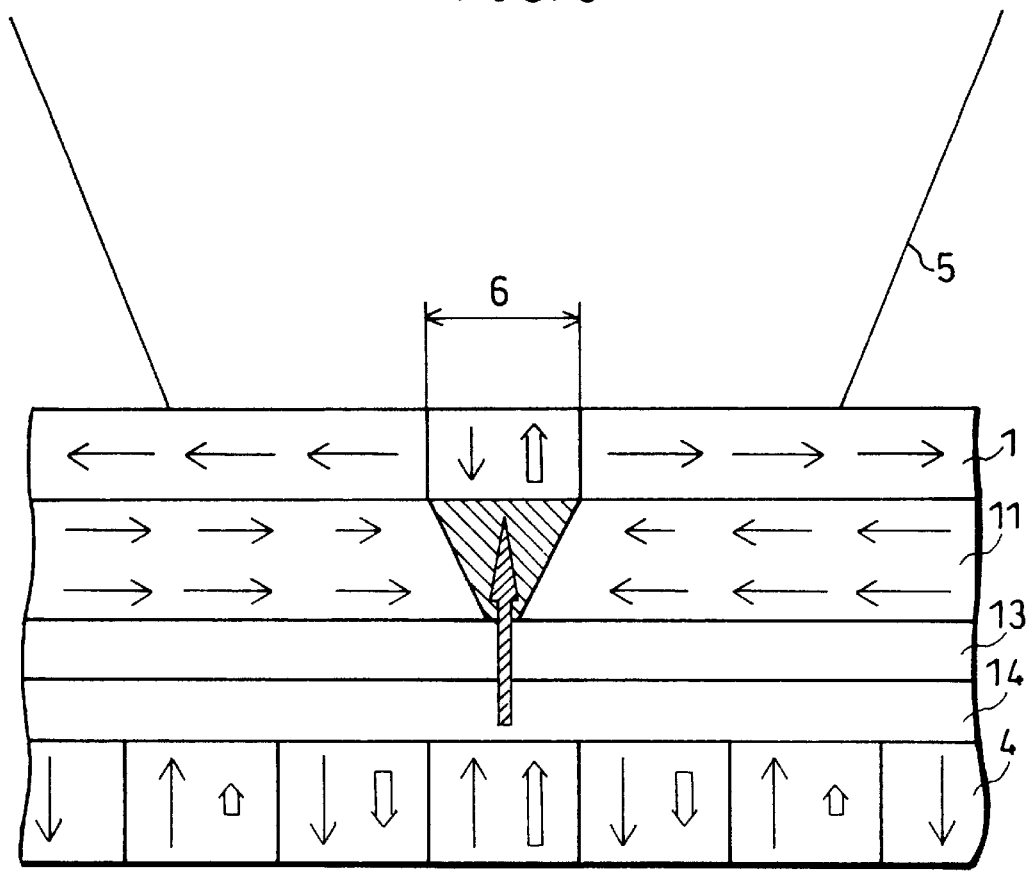
FIG. 6 is an explanatory drawing illustrating the principle of reproducing in a magneto-optical recording medium according to a sixth embodiment of the present invention.

The following will explain a sixth embodiment of the present invention with reference to FIG. 6. For ease of explanation, members having the same functions as those shown in the drawings pertaining to the first through fifth embodiments above will be given the same reference symbols, and explanation thereof will be omitted here.

First, the principle of ultra-high resolution reproducing operations in the magneto-optical recording medium according to the present embodiment will be explained. FIG. 6 is an explanatory drawing showing magnetization states of the magneto-optical recording medium according to the present embodiment.

The magneto-optical recording medium according to the present embodiment is made up of a reproducing layer 1, a third in-plane magnetized layer 11, a non-magnetic intermediate layer 13, a reflective layer 14, and a recording layer 4, in that order. The reproducing layer 1 has in-plane magnetization at room temperature and perpendicular magnetization at temperatures at and above a critical temperature. In the third in-plane magnetized layer 11, Curie temperature changes continuously in the direction of layer thickness, such that a Curie temperature $T_3$ at an interface with the reproducing layer 1 is in the vicinity of the critical temperature, and a Curie temperature $T_4$ at an interface with the non-magnetic intermediate layer 13 is higher than the Curie temperature $T_3$. The non-magnetic intermediate layer 13 is made of a non-magnetic film. The recording layer 4 is made of a perpendicularly magnetized film having a compensation temperature in the vicinity of room temperature.

In the magneto-optical recording medium according to the fourth embodiment above, by providing the non-magnetic intermediate layer 12 between the third in-plane magnetized layer 11 and the recording layer 4, exchange coupling between these two layers was shut out, and it was possible to reduce the thickness of the third in-plane magnetized layer 11. However, in the magneto-optical recording medium according to the present embodiment, by replacing the non-magnetic intermediate layer 12 with the non-magnetic intermediate layer 13, which is a transparent dielectric body, and by further providing the reflective layer 14, an interference effect produced in the multi-layered structure results in increased Kerr rotation angle. Further, since the light beam 5 is reflected by the reflective layer 14, reproducing of signals from the recording layer 4 can be more effectively prevented, and it is possible to reproduce only the information copied to the reproducing layer 1. Consequently, ultra-high resolution reproducing characteristics can be improved.

As discussed above, by providing the magneto-optical recording medium according to the present embodiment with a reflective layer 14 between the non-magnetic intermediate layer 13 and the recording layer 4, in addition to the effects obtained with the structure according to the fourth embodiment above, it is possible to completely shut out leakage of magnetic flux from the recording layer 4 in the vicinity of the perpendicularly magnetized domain 6, and thus to further improve reproducing resolution.

EXAMPLES

The following will explain concrete examples of magneto-optical recording mediums according to the present invention.

Example 1

Figure 7:
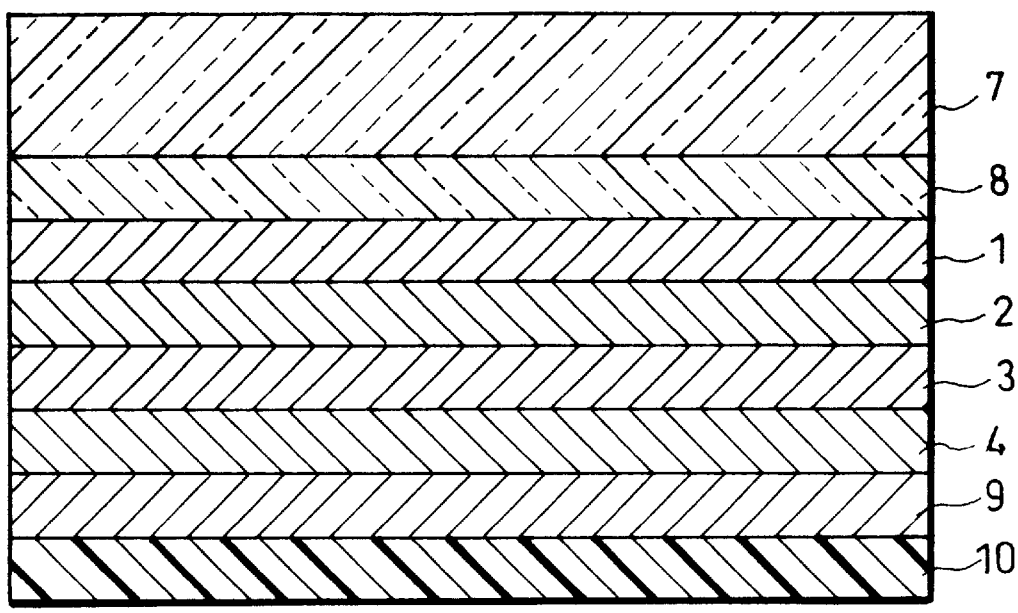
FIG. 7 is a cross-sectional view showing the structure of a magneto-optical disk according to a first Example of the present invention.

The following will explain a first Example of the present invention with reference to FIG. 7. The present Example explains in detail the magneto-optical recording medium according to the first embodiment above, applied to a magneto-optical disk.

As shown in FIG. 7, a magneto-optical disk which applies the foregoing magneto-optical recording medium is made up of a magneto-optical disk substrate 7, on which are provided a transparent dielectric layer 8, a reproducing layer 1, a first in-plane magnetic layer 2, a second in-plane magnetized layer 3, a recording layer 4, a protective layer 9, and an overcoat layer 10, in that order.

The recording method used in the foregoing magneto-optical disk is the Curie temperature recording method. In other words, in recording, a light beam 5 projected by a semiconductor laser is focused on the recording layer 4, heating the recording layer 4 to above its Curie temperature, and applying an external magnetic field to the recording layer 4 control the direction of magnetization thereof.

Further, in reproducing, the light beam 5 is set to a weaker power than during recording, and reproducing is performed using a magneto-optical effect known as polar Kerr effect. Polar Kerr effect is a phenomenon in which, depending on the direction (up or down) of magnetization perpendicular to a surface on which light is incident, the direction of rotation of a plane of polarization of light reflected therefrom switches to the opposite direction.

The magneto-optical disk substrate 7 is made of a transparent material such as polycarbonate, formed in the shape of a disk, and a surface thereof on which films are to be formed is provided with guide grooves, etc.

The transparent dielectric layer 8 is preferably made of a transparent dielectric body such as AlN, SiN, AlSiN, $Ta_2O_3$, etc. The thickness thereof must be set so as to realize a good interference effect with the incident light beam 5, and so as to increase the polar Kerr rotation angle of the magneto-optical recording medium. Accordingly, if the wavelength of the light beam 5 is $\lambda$, and the refractive index of the transparent dielectric layer 8 is n, the thickness of the transparent dielectric layer 8 is set to around $\lambda/4$ n. For example, when the wavelength of the light beam 5 is 680 nm, the thickness of the transparent dielectric layer 8 can be set to no less than 40 nm and no more than 100 nm.

The reproducing layer 1 is an alloy film chiefly composed of a rare earth-transition metal alloy, having characteristics whereby it has in-plane magnetization at room temperature and shifts to have perpendicular magnetization at temperatures at and above a critical temperature. For the reproducing layer 1, a material containing a high proportion of rare earth (RE) metal at room temperature (RE-rich) may be used, such as GdFeCo, GdFe, GdDyFeCo, GdDyFe, etc.

It is preferable to set the thickness of the reproducing layer 1 in a range from 15 nm through 60 nm. If the reproducing layer 1 is thinner than 15 nm, good in-plane magnetization mask effects cannot be obtained, and if thicker than 60 nm, recording sensitivity is markedly impaired by the increased layer thickness.

The first in-plane magnetized layer 2 is an in-plane magnetized layer having a Curie temperature $T_1$ in the vicinity of the critical temperature of the reproducing layer 1. For the first in-plane magnetized layer 2, an alloy film chiefly composed of a rare earth-transition metal alloy may be used, for example an in-plane magnetized film of GdFeCo, GdFe, GdDyFeCo, or GdDyFe. Further, in order to adjust the Curie temperature of any of the foregoing in-plane magnetized films, it is also possible to use an in-plane magnetized film containing a non-magnetic metal such as Al, Ti, or Ta, or to use an in-plane magnetized film containing a light rare earth metal such as Nd.

It is preferable to set the thickness of the first in-plane magnetized layer 2 in a range of from 1 nm through 20 nm. If the first in-plane magnetized layer 2 is thinner than 1 nm, the reproducing layer 1 and the first in-plane magnetized layer 2 will be exchange coupled even at temperatures above the Curie temperature $T_1$ of the first in-plane magnetized layer 2, and it becomes difficult to form the perpendicularly magnetized domain 6 in the reproducing layer 1. Further, if the first in-plane magnetized layer 2 is thicker than 20 nm, exchange coupling of the reproducing layer 1 and the second in-plane magnetized layer 3 through the first in-plane magnetized layer 2 is markedly weakened at temperatures below the Curie temperature $T_1$ of the first in-plane magnetized layer 2, making it difficult to strengthen the in-plane magnetization mask of the reproducing layer 1.

The second in-plane magnetized layer 3 is an in-plane magnetized layer having a Curie temperature $T_2$ which is higher than the Curie temperature $T_1$ of the first in-plane magnetized layer 2. For the second in-plane magnetized layer 3, an alloy film chiefly composed of a rare earth-transition metal alloy may be used, for example an in-plane magnetized film of GdFeCo, GdFe, GdDyFeCo, or GdDyFe.

Further, in order to adjust the Curie temperature of the second in-plane magnetized layer 3, it is also possible to use an in-plane magnetized film containing a non-magnetic metal such as Al, Ti, or Ta, or to use an in-plane magnetized film containing a light rare earth metal such as Nd.

It is preferable to set the thickness of the second in-plane magnetized layer 3 to no less than 30 nm. If the second in-plane magnetized layer 3 is thinner than 30 nm, due to exchange coupling force from the recording layer 4, it is difficult to give the second in-plane magnetized layer 3 completely in-plane magnetization, and the in-plane magnetization mask of the reproducing layer 1 is weakened.

Further, it is preferable to set the total thickness of the first and second in-plane magnetized layers 2 and 3 to no more than 60 nm. If the total thickness of the first and second in-plane magnetized layers 2 and 3 is more than 60 nm, due to the increased distance between the reproducing layer 1 and the recording layer 4, magneto-static coupling force acting between these layers is weakened, making it difficult to perform stable reproducing.

The recording layer 4 is a perpendicularly magnetized film made of a rare earth-transition metal alloy. For the recording layer 4, a material such as TbFeCo, DyFeCo, TbDyFeCo, GdTbFeCo, GdDyFeCo, or GdTbDyFeCo may be used.

It is preferable to set the thickness of the recording layer in a range from 30 nm through 80 nm. Reproducing is performed, in the perpendicularly magnetized domain 6, by magnetostatic coupling of the magnetization of the reproducing layer 1 and leaking magnetic flux produced by the recording layer 4, and thus the recording layer 4 must produce a sufficiently large leaking magnetic flux. Accordingly, if the recording layer 4 is thinner than 30 nm, the recording layer 4 produces less leaking magnetic flux, and it becomes difficult to perform stable reproducing. If the recording layer 4 is thicker than 80 nm, on the other hand, recording sensitivity is markedly impaired by the increased layer thickness.

The protective layer 9 is made of a transparent dielectric body such as AlN, SiN, AlSiN, or $Ta_2O_3$, or of a non-magnetic metal such as Al, Ti, Ta, or Ni, and is provided to prevent oxidation of the rare earth-transition metal alloys used in the reproducing layer 1, the first and second in-plane magnetized layers 2 and 3, and the recording layer 4. It is preferable if the thickness of the protective layer 9 is set in a range from 5 nm through 60 nm. If the protective layer 9 is thinner than 5 nm, its oxidation preventing effects are impaired, and if thicker than 60 nm, recording sensitivity is markedly impaired by the increased layer thickness.

The overcoat layer 10 is a lubricating layer made of UV-setting resin or thermosetting resin, and is provided to protect the magneto-optical recording medium from physical abrasion.

In addition, for purposes of low-magnetic-field recording, a recording auxiliary layer may be provided adjacent to the recording layer 41 made of a perpendicularly magnetized film having a higher Curie temperature and smaller coercive force than the recording layer 4, for example, a perpendicularly magnetized film of GdFeCo, GdTbFeCo, or GdDyFeCo.

Further, if the protective layer 9 is provided with a heat dissipating layer of Al, AlTi, AlNi, AlTa, etc., on which the overcoat layer 10 is provided, heat characteristics of the magneto-optical recording medium can be improved. Specifically, heat accumulating in the magneto-optical recording medium due to projection of the laser beam is quickly dissipated through the heat dissipating layer, thus preventing impairment of characteristics by excessive temperature increase.

The following will explain a method of forming the foregoing magneto-optical disk, and specific examples of recording and reproducing thereof.

(1) Method of Forming Magneto-Optical Disk

The following explains a method of forming a magneto-optical disk structured as above.

First, the magneto-optical disk substrate 7, made of disk-shaped polycarbonate having guide grooves made up of lands 0.50 cm in width, grooves 0.50 μm in width, and groove depth of 70 nm, was placed in a sputtering device provided with targets of Al, Gd, Tb, Fe, and Co.

Then, after evacuating the interior of the sputtering device to $1\times10^{-6}$ Torr, a mixed gas of argon and nitrogen was introduced, a voltage was supplied to the Al target, and at a gas pressure of $4\times10^{-3}$, the transparent dielectric layer 8, of AlN with a thickness of 80 nm, was formed on the magneto-optical disk substrate 7.

Next, after again evacuating the interior of the sputtering device to $1\times10^{-6}$ Torr, argon gas was introduced, voltage was supplied to the Gd, Fe, and Co targets, and at a gas pressure of $4\times10^{-3}$, the reproducing layer 1, of $Gd_{0.3}$, $(Fe_{0.80}Co_{0.20})_{0.69}$ with a thickness of 30 nm, was formed on the transparent dielectric layer 8. Characteristics of the reproducing layer 1 were such that it had in-plane magnetization at room temperature, shifted to perpendicular magnetization at a critical temperature of 150° C. and maintained perpendicular magnetization to its Curie temperature of 320° C., and had no compensation point.

Next, voltage was supplied to the Gd and Fe targets, and at a gas pressure of $4\times10^{-3}$ Torr, the first in-plane magnetized layer 2, of $Gd_{0.12}Fe_{0.88}$ with a thickness of 5 nm, was formed on the reproducing layer 1. The first in-plane magnetized layer 2 was an in-plane magnetized film containing a high proportion of transition metal (TM) (was TM-rich) from room temperature through its Curie temperature $T_1$ of 140° C.

Next, voltage was supplied to the Gd, Fe, and Co targets, and at a gas pressure of $4\times10^{-3}$ Torr, the second in-plane magnetized layer 3, of $Gd_{0.12}(Fe_{0.88}Co_{0.12})_{0.88}$ with a thickness of 35 nm, was formed on the first in-plane magnetized layer 2. The second in-plane magnetized layer 3 was an in-plane magnetized film which was TM-rich from room temperature through its Curie temperature $T_2$ of 220° C.

Next, voltage was supplied to the Tb, Fe, and Co targets, and at a gas pressure of $4\times10^{-3}$ Torr, the recording layer 4, of $Tb_{0.22}(Fe_{0.82}Co_{0.18})_{0.78}$ with a thickness of 40 nm, was formed on the second in-plane magnetized layer 3. The recording layer 4 had a compensation temperature of 25° C. and a Curie temperature of 260° C.

Then a mixed gas of argon and nitrogen was introduced, voltage was applied to the Al target, and at a gas pressure of $4\times10^{-3}$ Torr, the protective layer 9, of AlN with a thickness of 20 nm, was formed on the recording layer 4.

Finally, a UV-setting resin was spin-coated onto the protective layer 9, and the overcoat layer 10 was formed by projecting UV rays thereon.

(2) Recording and Reproducing Characteristics

Using an optical pickup equipped with a semiconductor laser of 680 nm wavelength, CNR (carrier-to-noise ratio) on the lands of the foregoing magneto-optical disk was measured. Here, recording was performed by the magnetic field modulation recording method. In other words, while rotating the foregoing magneto-optical disk at a line speed of 2.5 m/sec, recording was performed by continuously projecting a laser power of 6 mW onto the magneto-optical disk and applying a recording magnetic field of $\pm 1.975\times 10^4$ A/m modulated at a frequency of 4 MHz.

Further, in reproducing, laser power was adjusted so as to obtain the largest CNR possible. With the ultra-high resolution magneto-optical disk according to the present Example, a reproducing laser power of 2.2 mW was used.

For purposes of comparison, an ultra-high resolution magneto-optical disk was prepared, as Comparative Example 1, in the same manner as the present Example, except that the second in-plane magnetized layer 3 was omitted and the first in-plane magnetized layer 2 had a thickness of 40 nm. Comparative Example 1 was also measured in the same way as noted above.

In the foregoing measurement, Comparative Example 1 yielded a CNR of 37.5 dB, while the present Example yielded a CNR of 39.5 dB. Accordingly, the present Example was found to have an increase in CNR of 2.0 dB over Comparative Example 1.

Further, after recording on the lands of the magneto-optical disks according to the present Example and Comparative Example 1 in the same way as above, the laser light was moved to an adjacent groove, and crosstalk (CT) from information recorded on the lands was measured. In this measurement, Comparative Example 1 yielded a CT of 15.0 dB, while the present Example yielded a CT of 11.5 dB. In other words, in the present Example, a reduction in CT of 3.5 dB was found.

The present Example used a reproducing layer 1 of $Gd_{0.31}(Fe_{0.80}Co_{0.20})_{0.69}$ a first in-plane magnetized layer 2 having a TM-rich composition of $Gd_{0.12}Fe_{0.88}$, a second in-plane magnetized layer 3 having a TM-rich composition of $Gd_{0.12}(Fe_{0.88}Co_{0.12})_{0.88}$, and a recording layer 4 of $Tb_{0.22}(Fe_{0.82}Co_{0.18})_{0.78}$, but these layers are not limited to these respective compositions.

It is sufficient if the reproducing layer 1 has magnetic characteristics whereby it shifts from in-plane to perpendicular magnetization at a temperature in a range from 100° C. through 200° C. It is also possible to use for the first and second in-plane magnetized layers 2 and 3 in-plane magnetized films of an RE-rich composition. Further, magnetization of the recording layer 4 increases as temperature increases from room temperature, and it is preferable if the recording layer 4 has a compensation temperature in the vicinity of room temperature, so that the recording layer 4 has maximum magnetization in the vicinity of the temperature at which the reproducing layer has perpendicular magnetization.

Example 2

Figure 8:
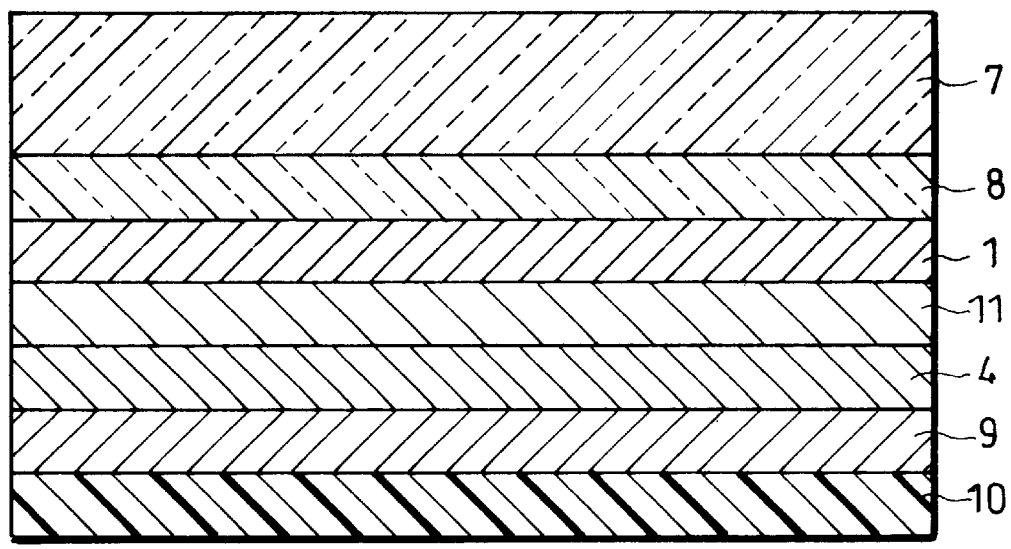
FIG. 8 is a cross-sectional view showing the structure of a magneto-optical disk according to a second Example of the present invention.

The following will explain a second Example of the present invention with reference to FIG. 8. The present Example explains in detail the magneto-optical recording medium according to the second embodiment above, applied to a magneto-optical disk.

As shown in FIG. 8, the magneto-optical disk according to the present Example is made up of a magneto-optical disk substrate 7, on which are provided a transparent dielectric layer 8, a reproducing layer 1, a third in-plane magnetic layer 11, a recording layer 4, a protective layer 9, and an overcoat layer 10, in that order.

Recording and reproducing of the magneto-optical disk according to the present Example are performed in the same way as in Example 1 above. Further, the magneto-optical disk substrate 7, the transparent dielectric layer 8, the reproducing layer 1, the recording layer 4, the protective layer 9, and the overcoat layer 10 may be made of the same materials as those used in Example 1 above.

The third in-plane magnetized layer 11 is formed such that Curie temperature changes continuously in the direction of layer thickness, so that a Curie temperature $T_3$ at an interface with the reproducing layer 1 is in the vicinity of the critical temperature, and a Curie temperature $T_4$ at an interface with the recording layer 4 is higher than the Curie temperature $T_3$. The third in-plane magnetized layer 11 may be realized by giving a composition grade in the direction of layer thickness to an alloy film chiefly composed of a rare earth-transition metal alloy, for example an in-plane magnetized film of GdFeCo, GdFe, GdDyFeCo, or GdDyFe; an in-plane magnetized film containing a non-magnetic metal such as Al, Ti, or Ta to adjust the Curie temperature of any of the foregoing in-plane magnetized films; or an in-plane magnetized film containing a light rare earth metal such as Nd.

It is preferable to set the thickness of the third in-plane magnetized layer 11 in a range from 30 nm through 60 nm. If the third in-plane magnetized layer 11 is thinner than 30 nm, due to exchange coupling force from the recording layer 4, it is difficult to give the third in-plane magnetized layer 11 completely in-plane magnetization, and the in-plane magnetization mask of the reproducing layer 1 is weakened. If, on the other hand, the thickness of the third in-plane magnetized layer 11 is more than 60 nm, due to the increased distance between the reproducing layer 1 and the recording layer 4, magneto-static coupling force acting between these layers is weakened, making it difficult to perform stable reproducing.

In addition, for purposes of low-magnetic-field recording, a recording auxiliary layer may be provided adjacent to the recording layer 4, made of a perpendicularly magnetized film having a higher Curie temperature and smaller coercive force than the recording layer 4, for example, a perpendicularly magnetized film of GdFeCo, GdTbFeCo, or GdDyFeCo.

Further, if the protective layer 9 is provided with a heat dissipating layer of Al, AlTi, AlNi, AlTa, etc., on which the overcoat layer 10 is provided, heat characteristics of the magneto-optical recording medium can be improved. Specifically, heat accumulating in the magneto-optical recording medium due to projection of the laser beam is quickly dissipated through the heat dissipating layer, thus preventing impairment of characteristics by excessive temperature increase.

The following will explain a method of forming the foregoing magneto-optical disk, and specific examples of recording and reproducing thereof.

(1) Method of Forming Magneto-optical Disk

The following explains a method of forming a magneto-optical disk structured as above.

First, the magneto-optical disk substrate 7, made of disk-shaped polycarbonate having guide grooves made up of lands 0.50 cm in width, grooves 0.50 μm in width, and groove depth of 70 nm, was placed in a sputtering device provided with targets of Al, Gd, Tb, Fe, and Co.

Then, in the same manner as in Example 1 above, the transparent dielectric layer 8 was formed of AlN with a thickness of 80 nm, and the reproducing layer 1 was formed of $Gd_{0.31}(Fe_{0.80}Co_{0.20})_{0.69}$ with a thickness of 30 nm.

Next, voltage was supplied to the Gd, Fe, Co, and Al targets, and at a gas pressure of $4\times10^{-3}$ Torr, the third in-plane magnetized layer 11 was formed on the reproducing layer 1 with a thickness of 40 nm. At the beginning of film formation, voltage was supplied to the respective targets with a ratio of (Gd:Fe:Co:Al=10:80:5:5), after which the voltages supplied to the Fe and Co targets were continuously changed, so that voltage supplied to the respective targets at the completion of film formation had a ratio of (Gd:Fe:Co:Al=10:70:15:5). The third in-plane magnetized layer 11 was an in-plane magnetized film having a Curie temperature $T_3$ at the interface with the reproducing layer 1 of 140° C., and a Curie temperature $T_4$ at the interface with the recording layer 4 of 230° C., and was TM-rich at temperatures of room temperature and higher.

Next, in the same manner as in Example 1 above, the recording layer 4 was formed of $Tb_{0.22}(Fe_{0.82}Co_{0.18})_{0.78}$ with a thickness of 40 nm, the protective layer 9 was formed of AlN with a thickness of 20 nm, and the overcoat layer 10 was formed.

(2) Recording and Reproducing Characteristics

Using an optical pickup equipped with a semiconductor laser of 680 nm wavelength, CNR on the lands of the foregoing magneto-optical disk was measured. Here, recording was performed by the magnetic field modulation recording method. While rotating the foregoing magneto-optical disk at a line speed of 2.5 m/sec, recording was performed by continuously projecting a laser power of 6 mW onto the magneto-optical disk and applying a recording magnetic field of $\pm1.975\times10^4$ A/m modulated at a frequency of 4 MHz.

Further, in reproducing, laser power was adjusted so as to obtain the largest CNR possible. With the ultra-high resolution magneto-optical disk according to the present Example, a reproducing laser power of 2.2 mW was used.

For purposes of comparison, an ultra-high resolution magneto-optical disk was prepared, as Comparative Example 2, in the same manner as the present Example, except that during formation of the third in-plane magnetized layer 11, voltage was supplied to the respective targets at a constant ratio throughout film formation, at a ratio of (Gd:Fe:Co:Al=10:80:5:5). Comparative Example 2 was also measured in the same way as noted above.

In the foregoing measurement, Comparative Example 2 yielded a CNR of 37.0 dB, while the present Example yielded a CNR of 39.0 dB. Accordingly, the present Example was found to have an increase in CNR of 2.0 dB over Comparative Example 2.

Further, after recording on the lands of the magneto-optical disks according to the present Example and Comparative Example 2 in the same way as above, the laser light was moved to an adjacent groove, and crosstalk from information recorded on the lands was measured. In this measurement, Comparative Example 2 yielded crosstalk of 15.5 dB, while the present Example yielded crosstalk of 11.5 dB. In other words, in the present Example, a reduction in crosstalk of 4.0 dB was found.

The present Example used a reproducing layer 1 of $Gd_{0.31}(Fe_{0.80}Co_{0.20})_{0.69}$, a third in-plane magnetized layer 11 of a composition-modulated film with a TM-rich composition of GdFeCoAl, and a recording layer 4 of $Tb_{0.22}(Fe_{0.82}Co_{0.18})_{0.78}$, but these layers are not limited to these respective compositions.

It is sufficient if the reproducing layer 1 has magnetic characteristics whereby it shifts from in-plane to perpendicular magnetization at a temperature in a range from 100° C. through 200° C. It is also possible to use for the third in-plane magnetized layer 11 an in-plane magnetized film of an RE-rich composition. Further, magnetization of the recording layer 4 increases as temperature increases from room temperature, and it is preferable if the recording layer 4 has a compensation temperature in the vicinity of room temperature, so that the recording layer 4 has maximum magnetization in the vicinity of the temperature at which the reproducing layer has perpendicular magnetization.

Example 3

Figure 9:
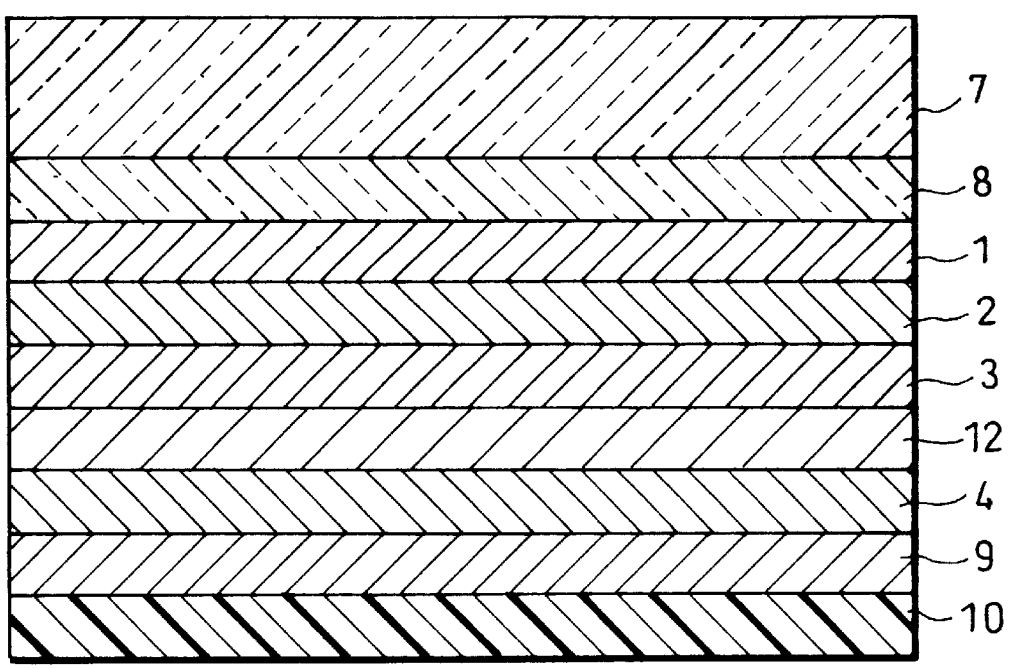
FIG. 9 is a cross-sectional view showing the structure of a magneto-optical disk according to a third Example of the present invention.

The following will explain a third Example of the present invention with reference to FIG. 9. The present Example explains in detail the magneto-optical recording medium according to the third embodiment above, applied to a magneto-optical disk.

As shown in FIG. 9, the magneto-optical disk according to the present Example is made up of a magneto-optical disk substrate 7, on which are provided a transparent dielectric layer 8, a reproducing layer 1, a first in-plane magnetic layer 2, a second in-plane magnetized layer 3, a non-magnetic intermediate layer 12, a recording layer 4, a protective layer 9, and an overcoat layer 10, in that order.

Recording and reproducing of the magneto-optical disk according to the present Example are performed in the same way as in Example 1 above. Further, the magneto-optical disk substrate 7, the transparent dielectric layer 8, the reproducing layer 1, the first and second in-plane magnetized layers 2 and 3, the recording layer 4, the protective layer 9, and the overcoat layer 10 may be made of the same materials as those used in Example 1 above.

In Example 1 above, since the second in-plane magnetized layer 3 and the recording layer 4 were formed directly adjacent to one another, it was necessary to give the second in-plane magnetized layer 3 a thickness of at least 30 nm. However, in the present Example, since the second in-plane magnetized layer 3 and the recording layer 4 are separated by the non-magnetic intermediate layer 12, the second in-plane magnetized layer 3 and the recording layer 4 are not exchange coupled. Consequently, complete in-plane magnetization of the second in-plane magnetized layer 3 can be maintained even if the second in-plane magnetized layer 3 is formed as thin as 5 nm, and the effect of this is to improve characteristics.

The non-magnetic intermediate layer 12 is provided to shut out exchange coupling between the second in-plane magnetized layer 3 and the recording layer 4, and may be formed of a non-magnetic dielectric body such as AlN, SiN, AlSiN, or $Ta_2O_3$, of a non-magnetic metal such as Al, Si, Ti, or Ta, or of an alloy of any of the foregoing.

It is preferable to set the thickness of the non-magnetic intermediate layer 12 to 0.5 nm or more. By setting the thickness of the non-magnetic intermediate layer 12 to at least 0.5 nm, exchange coupling between the second in-plane magnetized layer 3 and the recording layer 4 can be completely shut out. Consequently, the second in-plane magnetized layer 3 can be made thinner.

Further, it is preferable to set the total thickness of the first and second in-plane magnetized layers 2 and 3 and the non-magnetic intermediate layer 12 to no more than 60 nm. If this total thickness is more than 60 nm, due to the increased distance between the reproducing layer 1 and the recording layer 4, magneto-static coupling force acting between these layers is weakened, making it difficult to perform stable reproducing.

In addition, for purposes of low-magnetic-field recording, a recording auxiliary layer may be provided adjacent to the recording layer 4, made of a perpendicularly magnetized film having a higher Curie temperature and smaller coercive force than the recording layer 4, for example, a perpendicularly magnetized film of GdFeCo, GdTbFeCo, or GdDyFeCo.

Further, if the protective layer 9 is provided with a heat dissipating layer of Al, AlTi, AlNi, AlTa, etc., on which the overcoat layer 10 is provided, heat characteristics of the magneto-optical recording medium can be improved. Specifically, heat accumulating in the magneto-optical recording medium due to projection of the laser beam is quickly dissipated through the heat dissipating layer, thus preventing impairment of characteristics by excessive temperature increase.

The following will explain a method of forming the foregoing magneto-optical disk, and specific examples of recording and reproducing thereof.

(1) Method of Forming Magneto-Optical Disk

The following explains a method of forming a magneto-optical disk structured as above.

First, the magneto-optical disk substrate 7, made of disk-shaped polycarbonate having guide grooves made up of lands 0.50 μm in width, grooves 0.50 μm in width, and groove depth of 70 nm, was placed in a sputtering device provided with targets of Al, Gd, Tb, Fe, and Co.

Then, in the same manner as in Example 1 above, the transparent dielectric layer 8 was formed of AlN with a thickness of 80 nm, the reproducing layer 1 was formed of $Gd_{0.31}(Fe_{0.80}Co_{0.20})_{0.69}$ with a thickness of 30 nm, the first in-plane magnetized layer 2 was formed of $Gd_{0.12}Fe_{0.88}$ with a thickness of 5 nm, and the second in-plane magnetized layer 3 was formed of $Gd_{0.12}(Fe_{0.88}Co_{0.12})_{0.88}$ with a thickness of 15 nm.

Next, a mixed gas of argon and nitrogen was introduced, voltage was supplied to the Al target, and at a gas pressure of $4 \times 10^{-3}$ Torr, the non-magnetic intermediate layer 12 was formed, of AlN with a thickness of 2 nm, on the second in-plane magnetized layer 3.

Next, in the same manner as in Example 1 above, the recording layer 4 was formed of $Tb_{0.22}(Fe_{0.82}Co_{0.18})_{0.78}$ with a thickness of 40 nm, the protective layer 9 was formed of AlN with a thickness of 20 nm, and the overcoat layer 10 was formed.

(2) Recording and Reproducing Characteristics

Using an optical pickup equipped with a semiconductor laser of 680 nm wavelength, CNR on the lands of the foregoing magneto-optical disk was measured. Here, recording was performed by the magnetic field modulation recording method. While rotating the foregoing magneto-optical disk at a line speed of 2.5 m/sec, recording was performed by continuously projecting a laser power of 5.6 mW onto the magneto-optical disk and applying a recording magnetic field of $\pm 1.975 \times 10^4$ A/m modulated at a frequency of 4 MHz.

Further, in reproducing, laser power was adjusted so as to obtain the largest CNR possible. With the ultra-high resolution magneto-optical disk according to the present Example, a reproducing laser power of 1.9 mW was used.

For purposes of comparison, an ultra-high resolution magneto-optical disk was prepared, as Comparative Example 3, in the same manner as the present Example, except that the second in-plane magnetized layer 3 was omitted, and the first in-plane magnetized layer 2 was formed with a thickness of 20 nm. Comparative Example 3 was also measured in the same way as noted above.

In the foregoing measurement, Comparative Example 3 yielded a CNR of 38.0 dB, while the present Example yielded a CNR of 40.0 dB. Accordingly, the present Example was found to have an increase in CNR of 2.0 dB over Comparative Example 3.

Further, after recording on the lands of the magneto-optical disks according to the present Example and Comparative Example 3 in the same way as above, the laser light was moved to an adjacent groove, and crosstalk from information recorded on the lands was measured. In this measurement, Comparative Example 3 yielded crosstalk of 14.0 dB, while the present Example yielded crosstalk of 10.5 dB. In other words, in the present Example, a reduction in crosstalk of 3.5 dB was found.

The present Example used a reproducing layer 1 of $Gd_{0.31}(Fe_{0.80}Co_{0.20})_{0.69}$, a first in-plane magnetized layer 2 having a TM-rich composition of $Gd_{0.12}Fe_{0.88}$, a second in-plane magnetized layer 3 having a TM-rich composition of $Gd_{0.12}(Fe_{0.88}Co_{0.12})_{0.88}$, and a recording layer 4 of $Tb_{0.22}(Fe_{0.82}Co_{0.18})_{0.78}$, but these layers are not limited to these respective compositions.

It is sufficient if the reproducing layer 1 has magnetic characteristics whereby it shifts from in-plane to perpendicular magnetization at a temperature in a range from 100° C. through 200° C. It is also possible to use for the first and second in-plane magnetized layers 2 and 3 in-plane magnetized films of an RE-rich composition. Further, magnetization of the recording layer 4 increases as temperature increases from room temperature, and it is preferable if the recording layer 4 has a compensation temperature in the vicinity of room temperature, so that the recording layer 4 has maximum magnetization in the vicinity of the temperature at which the reproducing layer has perpendicular magnetization.

Example 4

Figure 10:
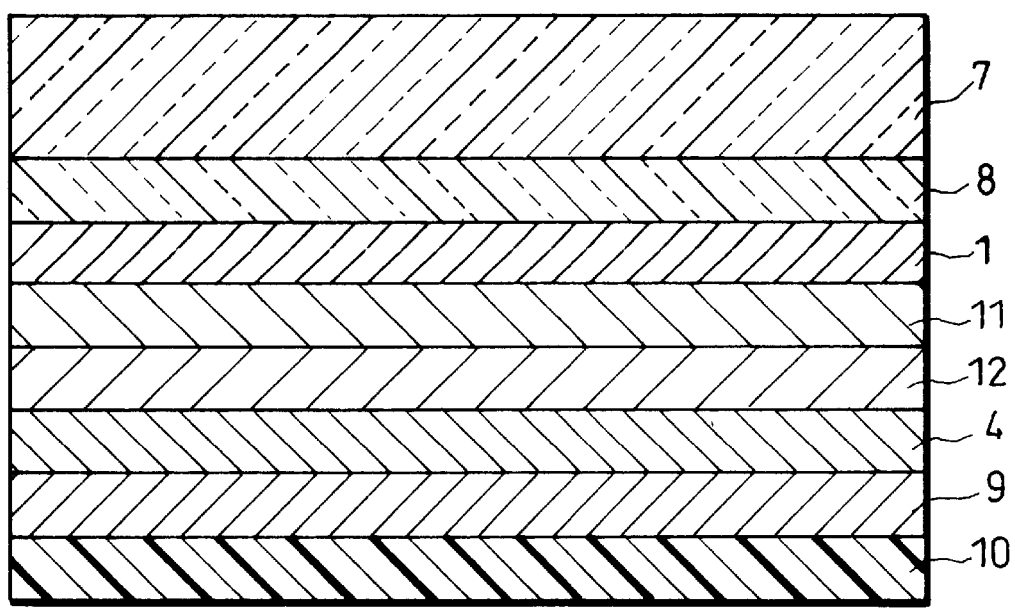
FIG. 10 is a cross-sectional view showing the structure of a magneto-optical disk according to a fourth Example of the present invention.

The following will explain a fourth Example of the present invention with reference to FIG. 10. The present Example explains in detail the magneto-optical recording medium according to the fourth embodiment above, applied to a magneto-optical disk.

As shown in FIG. 10, the magneto-optical disk according to the present Example is made up of a magneto-optical disk substrate 7, on which are provided a transparent dielectric layer 8, a reproducing layer 1, a third in-plane magnetized layer 11, a non-magnetic intermediate layer 12, a recording layer 4, a protective layer 9, and an overcoat layer 10, in that order.

Recording and reproducing of the magneto-optical disk according to the present Example are performed in the same way as in Example 1 above. Further, the magneto-optical disk substrate 7, the transparent dielectric layer 8, the reproducing layer 1, the third in-plane magnetized layer 11, the recording layer 4, the protective layer 9, and the overcoat layer 10 may be made of the same materials as those used in Example 1 above.

In Example 2 above, since the third in-plane magnetized layer 11 and the recording layer 4 were formed directly adjacent to one another, it was necessary to give the third in-plane magnetized layer 11 a thickness of at least 30 nm. However, in the present Example, since the third in-plane magnetized layer 11 and the recording layer 4 are separated by the non-magnetic intermediate layer 12, the third in-plane magnetized layer 11 and the recording layer 4 are not exchange coupled. Consequently, complete in-plane magnetization of the third in-plane magnetized layer 11 can be maintained even if the third in-plane magnetized layer 11 is formed as thin as 10 nm, and the effect of this is to improve characteristics.

The non-magnetic intermediate layer 12 is provided to shut out exchange coupling between the third in-plane magnetized layer 11 and the recording layer 4, and may be formed of a non-magnetic dielectric body such as AlN, SiN, or AlSiN, of a non-magnetic metal such as Al, Si, Ti, or Ta, or of an alloy of any of the foregoing.

It is preferable to set the thickness of the non-magnetic intermediate layer 12 to 0.5 nm or more. By setting the thickness of the non-magnetic intermediate layer 12 to at least 0.5 nm, exchange coupling between the third in-plane magnetized layer 11 and the recording layer 4 can be completely shut out. Consequently, the third in-plane magnetized layer 11 can be made thinner.

Further, it is preferable to set the total thickness of the third in-plane magnetized layer 11 and the non-magnetic intermediate layer 12 to no more than 60 nm. If the total thickness is more than 60 nm, due to the increased distance between the reproducing layer 1 and the recording layer 4, magneto-static coupling force acting between these layers is weakened, making it difficult to perform stable reproducing.

In addition, for purposes of low-magnetic-field recording, a recording auxiliary layer may be provided adjacent to the recording layer 4, made of a perpendicularly magnetized film having a higher Curie temperature and smaller coercive force than the recording layer 4, for example, a perpendicularly magnetized film of GdFeCo, GdTbFeCo, or GdDyFeCo.

Further, if the protective layer 9 is provided with a heat dissipating layer of Al, AlTi, AlNi, AlTa, etc., on which the overcoat layer 10 is provided, heat characteristics of the magneto-optical recording medium can be improved. Specifically, heat accumulating in the magneto-optical recording medium due to projection of the laser beam is quickly dissipated through the heat dissipating layer, thus preventing impairment of characteristics by excessive temperature increase.

The following will explain a method of forming the foregoing magneto-optical disk, and specific examples of recording and reproducing thereof.

(1) Method of Forming Magneto-Optical Disk

The following explains a method of forming a magneto-optical disk structured as above.

First, the magneto-optical disk substrate 7, made of disk-shaped polycarbonate having guide grooves made up of lands 0.50 $\mu$m in width, grooves 0.50 $\mu$m in width, and groove depth of 70 nm, was placed in a sputtering device provided with targets of Al, Gd, Tb, Fe, and Co.

Then, in the same manner as in Example 2 above, the transparent dielectric layer 8 was formed of AlN with a thickness of 80 nm, and the reproducing layer 1 was formed of $Gd_{0.31}(Fe_{0.80}Co_{0.20})_{0.69}$ with a thickness of 30 nm.

Next, voltage was supplied to the Gd, Fe, Co, and Al targets, and at a gas pressure of $4\times10^{-3}$ Torr, the third in-plane magnetized layer 11 was formed on the reproducing layer 1 with a thickness of 20 nm. At the beginning of film formation, voltage was supplied to the respective targets with a ratio of (Gd:Fe:Co:Al=10:80:5:5), after which the voltages supplied to the Fe and Co targets were continuously changed, so that voltage supplied to the respective targets at the completion of film formation had a ratio of (Gd:Fe:Co:Al=10:70:15:5). The third in-plane magnetized layer 11 was an in-plane magnetized film having a Curie temperature $T_3$ at the interface with the reproducing layer 1 of 140° C., and a Curie temperature $T_4$ at the interface with the recording layer 4 of 230° C., and was TM-rich at temperatures of room temperature and higher.

Next, in the same manner as in Example 3, the non-magnetic intermediate layer 12 was formed of AlN with a thickness of 2 nm, the recording layer 4 was formed of $Tb_{0.22}(Fe_{0.82}Co_{0.18})_{0.78}$ with a thickness of 40 nm, the protective layer 9 was formed of AlN with a thickness of 20 nm, and the overcoat layer 10 was formed.

(2) Recording and Reproducing Characteristics

Using an optical pickup equipped with a semiconductor laser of 680 nm wavelength, CNR on the lands of the foregoing magneto-optical disk was measured. Here, recording was performed by the magnetic field modulation recording method. While rotating the foregoing magneto-optical disk at a line speed of 2.5 m/sec, recording was performed by continuously projecting a laser power of 5.6 mW onto the magneto-optical disk and applying a recording magnetic field of $\pm 1.975\times 10^4$ A/m modulated at a frequency of 4 MHz.

Further, in reproducing, laser power was adjusted so as to obtain the largest CNR possible. With the ultra-high resolution magneto-optical disk according to the present Example, a reproducing laser power of 1.9 mW was used.

For purposes of comparison, an ultra-high resolution magneto-optical disk was prepared, as Comparative Example 4, in the same manner as the present Example, except that during formation of the third in-plane magnetized layer 11, voltage was supplied to the respective targets at a constant ratio throughout film formation, at a ratio of (Gd:Fe:Co:Al=10:80:5:5). Comparative Example 4 was also measured in the same way as noted above.

In the foregoing measurement, Comparative Example 4 yielded a CNR of 37.5 dB, while the present Example yielded a CNR of 39.5 dB. Accordingly, the present Example was found to have an increase in CNR of 2.0 dB over Comparative Example 4.

Further, after recording on the lands of the magneto-optical disks according to the present Example and Comparative Example 4 in the same way as above, the laser light was moved to an adjacent groove, and crosstalk from information recorded on the lands was measured. In this measurement, Comparative Example 4 yielded crosstalk of 14.0 dB, while the present Example yielded crosstalk of 11.0 dB. In other words, in the present Example, a reduction in crosstalk of 3.0 dB was found.

The present Example used a reproducing layer 1 of $Gd_{0.31}(Fe_{0.80}Co_{0.20})_{0.69}$, a third in-plane magnetized layer 11 of a composition-modulated film with a TM-rich composition of GdFeCoAl, and a recording layer 4 of $Tb_{0.22}(Fe_{0.82}Co_{0.18})_{0.78}$, but these layers are not limited to these respective compositions.

It is sufficient if the reproducing layer 1 has magnetic characteristics whereby it shifts from in-plane to perpendicular magnetization at a temperature in a range from 100° C. through 200° C. It is also possible to use for the third in-plane magnetized layer 11 an in-plane magnetized film of an RE-rich composition. Further, magnetization of the recording layer 4 increases as temperature increases from room temperature, and it is preferable if the recording layer 4 has a compensation temperature in the vicinity of room temperature, so that the recording layer 4 has maximum magnetization in the vicinity of the temperature at which the reproducing layer has perpendicular magnetization.

Example 5

Figure 11:
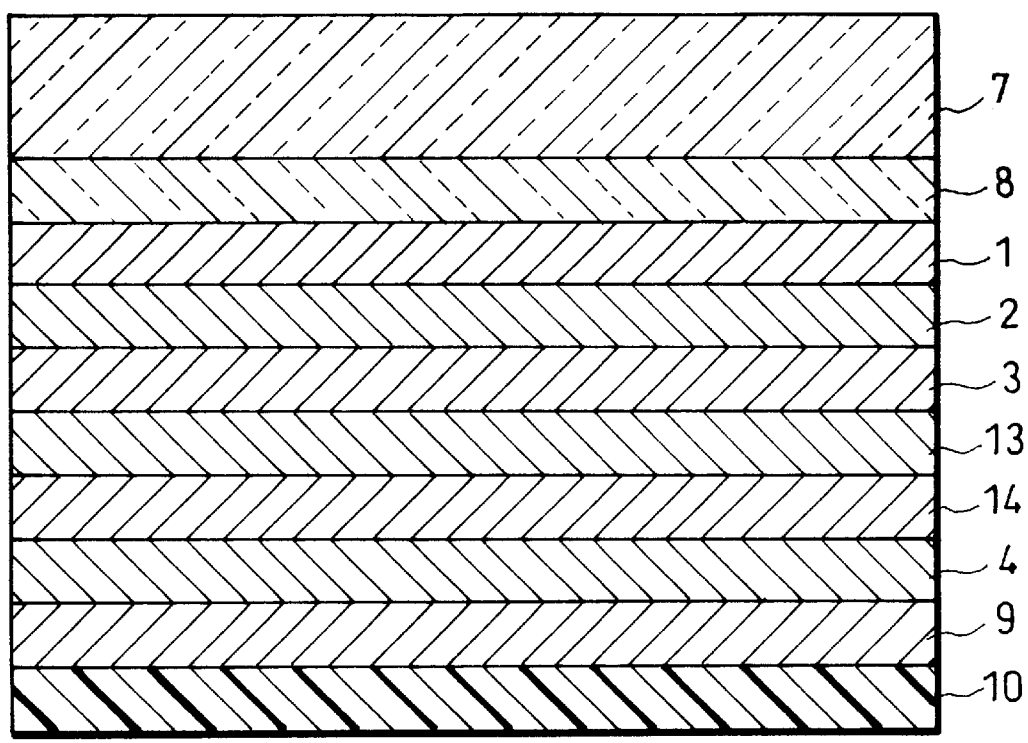
FIG. 11 is a cross-sectional view showing the structure of a magneto-optical disk according to a fifth Example of the present invention.

The following will explain a fifth Example of the present invention with reference to FIG. 11. The present Example explains in detail the magneto-optical recording medium according to the fifth embodiment above, applied to a magneto-optical disk.

As shown in FIG. 11, the magneto-optical disk according to the present Example is made up of a magneto-optical disk substrate 7, on which are provided a transparent dielectric layer 8, a reproducing layer 1, a first in-plane magnetic layer 2, a second in-plane magnetized layer 3, a non-magnetic intermediate layer 13, a reflective layer 14, a recording layer 4, a protective layer 9, and an overcoat layer 10, in that order.

Recording and reproducing of the magneto-optical disk according to the present Example are performed in the same way as in Example 1 above. Further, the magneto-optical disk substrate 7, the transparent dielectric layer 8, the reproducing layer 1, the first and second in-plane magnetized layers 2 and 3, the recording layer 4, the protective layer 9, and the overcoat layer 10 may be made of the same materials as those used in Example 1 above.

The non-magnetic intermediate layer 13, which is made of a transparent dielectric body, may be made of a non-magnetic dielectric body such as AlN, SiN, AlSiN, or $Ta_2O_3$.

The reflective layer 14 may be made of a non-magnetic metal such as Al, Ti, Ta, Pt, Au, or Cu, or of an alloy of two or more of these.

Further, in order to obtain good interference effects, it is preferable, as in Example 1 above, to set the thickness of the transparent dielectric layer 8 in a range from 40 nm through 100 nm, and to set the total thickness of the reproducing layer 1, the first in-plane magnetized layer 2, and the second in-plane magnetized layer 3 to no more than 50 nm. If this total thickness exceeds 50 nm, the quantity of light passing through the reproducing layer 1, the first in-plane magnetized layer 2, and the second in-plane magnetized layer 3 is reduced, making it difficult to increase the Kerr rotation angle by interference effect.

Further, in order to increase the Kerr rotation angle effectively, it is preferable if the thickness of the non-magnetic intermediate layer 13, which is a transparent dielectric body, is no less than 5 nm and no more than 30 nm.

Further, in order to more completely shut out reproducing of a signal from the recording layer 4 by means of the reflective layer 14, thereby reproducing only information copied to the reproducing layer 1, the reflective layer 14 must have a thickness of at least 5 nm.

Further, it is preferable to set the total thickness of the first and second in-plane magnetized layers 2 and 3, the non-magnetic intermediate layer 13 (which is a transparent dielectric body) and the reflective layer 14 to no more than 60 nm. If the total thickness is more than 60 nm, due to the increased distance between the reproducing layer 1 and the recording layer 4, magneto-static coupling force acting between these layers is weakened, making it difficult to perform stable reproducing.

In addition, for purposes of low-magnetic-field recording, a recording auxiliary layer may be provided adjacent to the recording layer 4, made of a perpendicularly magnetized film having a higher Curie temperature and smaller coercive force than the recording layer 4, for example, a perpendicularly magnetized film of GdFeCo, GdTbFeCo, or GdDyFeCo.

Further, if the protective layer 9 is provided with a heat dissipating layer of Al, AlTi, AlNi, AlTa, etc., on which the overcoat layer 10 is provided, heat characteristics of the magneto-optical recording medium can be improved. Specifically, heat accumulating in the magneto-optical recording medium due to projection of the laser beam is quickly dissipated through the heat dissipating layer, thus preventing impairment of characteristics by excessive temperature increase.

The following will explain a method of forming the foregoing magneto-optical disk, and specific examples of recording and reproducing thereof.

(1) Method of Forming Magneto-Optical Disk

The following explains a method of forming a magneto-optical disk structured as above.

First, the magneto-optical disk substrate 7, made of disk-shaped polycarbonate having guide grooves made up of lands 0.5 $\mu$m in width, grooves 0.5 $\mu$m in width, and groove depth of 70 nm, was placed in a sputtering device provided with targets of Al, Gd, Tb, Fe, Co, and AlTi.

Then, in the same manner as in Example 1 above, the transparent dielectric layer 8 was formed of AlN with a thickness of 80 nm, the reproducing layer 1 was formed of $Gd_{0.31}(Fe_{0.80}Co_{0.20})_{0.69}$ with a thickness of 18 nm, the first in-plane magnetized layer 2 was formed of $Gd_{0.12}Fe_{0.88}$ with a thickness of 2 nm, and the second in-plane magnetized layer 3 was formed of $Gd_{0.12}(Fe_{0.88}Co_{0.12})_{0.88}$ with a thickness of 5 nm.

Next, a mixed gas of argon and nitrogen was introduced, voltage was supplied to the Al target, and at a gas pressure of $4 \times 10^{-3}$ Torr, the non-magnetic intermediate layer 13, of AlN with a thickness of 20 nm, was formed on the second in-plane magnetized layer 3.

Then, after evacuating the interior of the sputtering device to $1 \times 10^{-6}$ Torr, argon gas was introduced, voltage was supplied to the AlTi target, and at a gas pressure of $4 \times 10^{-3}$ Torr, the reflective layer 14, of $Al_{0.90}Ti_{0.10}$ with a thickness of 15 nm, was formed on the non-magnetic intermediate layer 13 (which is a transparent dielectric body).

Next, in the same manner as in Example 1 above, the recording layer 4 was formed of $Tb_{0.22}(Fe_{0.82}Co_{0.18})_{0.78}$ with a thickness of 40 nm, the protective layer 9 was formed of AlN with a thickness of 20 nm, and the overcoat layer 10 was formed.

(2) Recording and Reproducing Characteristics

Using an optical pickup equipped with a semiconductor laser of 680 nm wavelength, CNR on the lands of the foregoing magneto-optical disk was measured. Here, recording was performed by the magnetic field modulation recording method. While rotating the foregoing magneto-optical disk at a line speed of 2.5 m/sec, recording was performed by continuously projecting a laser power of 6.2 mW onto the magneto-optical disk and applying a recording magnetic field of $\pm 1.975 \times 10^4$ A/m modulated at a frequency of 4 MHz.

Further, in reproducing, laser power was adjusted so as to obtain the largest CNR possible. With the ultra-high resolution magneto-optical disk according to the present Example, a reproducing laser power of 2.1 mW was used.

For purposes of comparison, an ultra-high resolution magneto-optical disk was prepared, as Comparative Example 5, in the same manner as the present Example, except that the reflective layer 14 was omitted. Comparative Example 5 was also measured in the same way as noted above.

In the foregoing measurement, Comparative Example 5 yielded a CNR of 39.5 dB, while the present Example yielded a CNR of 40.5 dB. Accordingly, the present Example was found to have an increase in CNR of 1.0 dB over Comparative Example 5.

Further, after recording on the lands of the magneto-optical disks according to the present Example and Comparative Example 5 in the same way as above, the laser light was moved to an adjacent groove, and crosstalk from information recorded on the lands was measured. In this measurement, Comparative Example 5 yielded crosstalk of 18.0 dB, while the present Example yielded crosstalk of 8.5 dB. In other words, in the present Example, a reduction in crosstalk of 9.5 dB was found.

The present Example used a reproducing layer 1 of $Gd_{0.31}(Fe_{0.80}Co_{0.20})_{0.69}$, a first in-plane magnetized layer 2 having a TM-rich composition of $Gd_{0.12}Fe_{0.88}$, a second in-plane magnetized layer 3 having a TM-rich composition of $Gd_{0.12}(Fe_{0.88}Co_{0.12})_{0.88}$ and a recording layer 4 of $Tb_{0.22}(Fe_{0.82}Co_{0.18})_{0.78}$, but these layers are not limited to these respective compositions.

It is sufficient if the reproducing layer 1 has magnetic characteristics whereby it shifts from in-plane to perpendicular magnetization at a temperature in a range from 100° C. through 200° C. It is also possible to use for the first and second in-plane magnetized layers 2 and 3 in-plane magnetized films of an RE-rich composition. Further, magnetization of the recording layer 4 increases as temperature increases from room temperature, and it is preferable if the recording layer 4 has a compensation temperature in the vicinity of room temperature, so that the recording layer 4 has maximum magnetization in the vicinity of the temperature at which the reproducing layer has perpendicular magnetization.

Example 6

Figure 12:
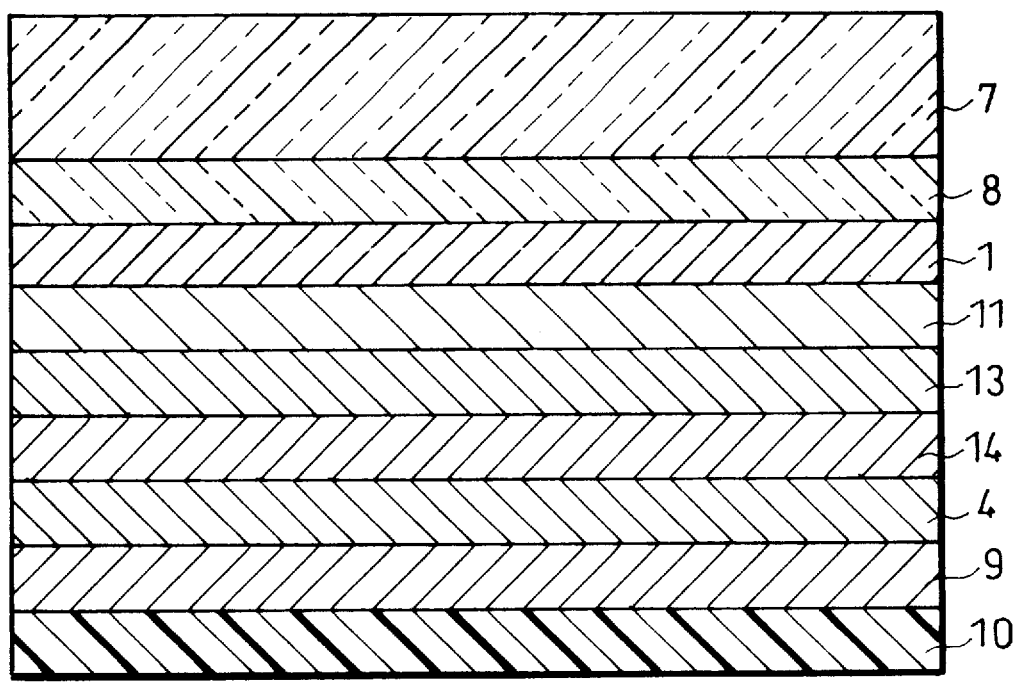
FIG. 12 is a cross-sectional view showing the structure of a magneto-optical disk according to a sixth Example of the present invention.
Figure 13:
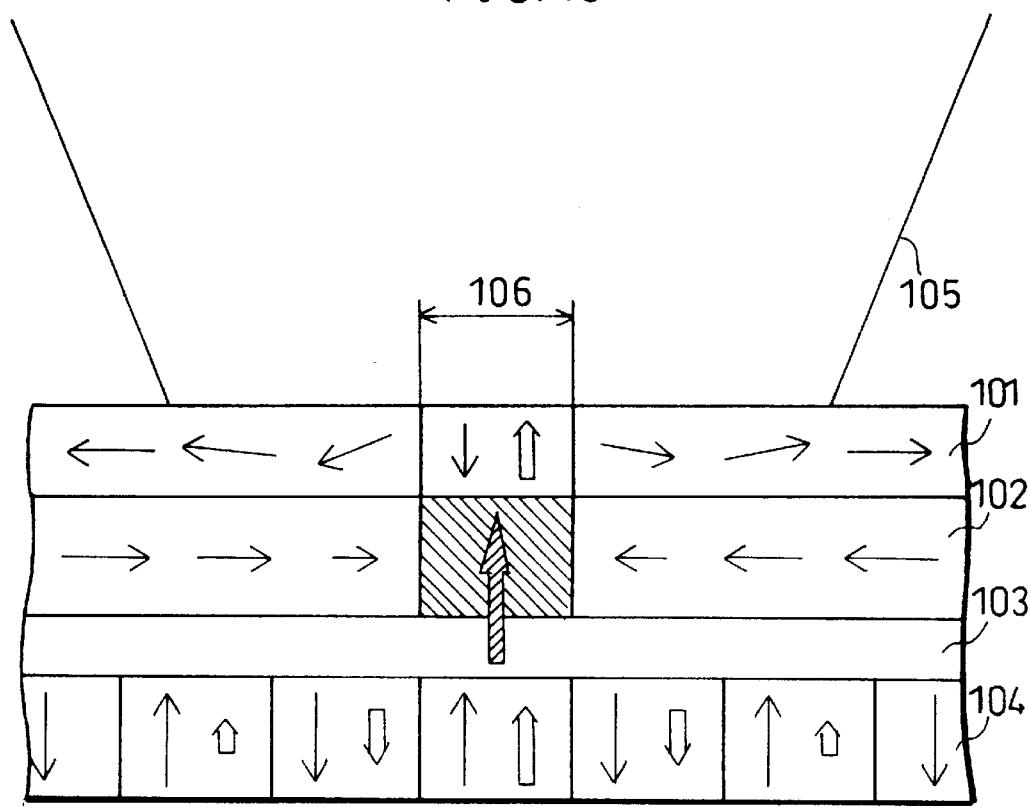
FIG. 13 is an explanatory drawing showing the principle of reproducing in a conventional magneto-optical recording medium.

The following will explain a sixth Example of the present invention with reference to FIG. 12. The present Example explains in detail the magneto-optical recording medium according to the sixth embodiment above, applied to a magneto-optical disk.

As shown in FIG. 12, the magneto-optical disk according to the present Example is made up of a magneto-optical disk substrate 7, on which are provided a transparent dielectric layer 8, a reproducing layer 1, a third in-plane magnetic layer 11, a non-magnetic intermediate layer 13, a reflective layer 14, a recording layer 4, a protective layer 9, and an overcoat layer 10, in that order.

Recording and reproducing of the magneto-optical disk according to the present Example are performed in the same way as in Example 1 above. Further, the magneto-optical disk substrate 7, the transparent dielectric layer 8, the reproducing layer 1, the non-magnetic intermediate layer 13 made of a transparent dielectric body, the reflective layer 14, the recording layer 4, the protective layer 9, and the overcoat layer 10 may be made of the same materials as those used in Example 5 above. Further, the third in-plane magnetized layer 11 may be made of the same materials as those used in Example 4 above.

Further, in order to obtain good interference effects, it is preferable, as in Example 1 above, to set the thickness of the transparent dielectric layer 8 in a range from 40 nm through 100 nm, and to set the total thickness of the reproducing layer 1 and the third in-plane magnetized layer 11 to no more than 50 nm. If this total thickness exceeds 50 nm, the quantity of light passing through the reproducing layer 1 and the third in-plane magnetized layer 11 is reduced, making it difficult to increase the Kerr rotation angle by interference effect.

Further, in order to increase the Kerr rotation angle effectively, it is preferable if the thickness of the non-magnetic intermediate layer 13, which is a transparent dielectric body, is no less than 5 nm and no more than 30 nm.

Further, in order to more completely shut out reproducing of a signal from the recording layer 4 by means of the reflective layer 14, thereby reproducing only information copied to the reproducing layer 1, the reflective layer 14 must have a thickness of at least 5 nm.

Further, it is preferable to set the total thickness of the third in-plane magnetized layer 11, the non-magnetic intermediate layer 13 (which is a transparent dielectric body) and the reflective layer 14 to no more than 60 nm. If this total thickness is more than 60 nm, due to the increased distance between the reproducing layer 1 and the recording layer 4, magneto-static coupling force acting between these layers is weakened, making it difficult to perform stable reproducing.

In addition, for purposes of low-magnetic-field recording, a recording auxiliary layer may be provided adjacent to the recording layer 4, made of a perpendicularly magnetized film having a higher Curie temperature and smaller coercive force than the recording layer 4, for example, a perpendicularly magnetized film of GdFeCo, GdTbFeCo, or GdDyFeCo.

Further, if the protective layer 9 is provided with a heat dissipating layer of Al, AlTi, AlNi, AlTa, etc., on which the overcoat layer 10 is provided, heat characteristics of the magneto-optical recording medium can be improved. Specifically, heat accumulating in the magneto-optical recording medium due to projection of the laser beam is quickly dissipated through the heat dissipating layer, thus preventing impairment of characteristics by excessive temperature increase.

The following will explain a method of forming the foregoing magneto-optical disk, and specific examples of recording and reproducing thereof.

(1) Method of Forming Magneto-Optical Disk

The following explains a method of forming a magneto-optical disk structured as above.

First, the magneto-optical disk substrate 7, made of disk-shaped polycarbonate having guide grooves made up of lands 0.5 m in width, grooves 0.5 m in width, and groove depth of 70 nm, was placed in a sputtering device provided with targets of Al, Gd, Tb, Fe, Co, and AlTi.

Then, in the same manner as in Example 4 above, the transparent dielectric layer 8 was formed of AlN with a thickness of 80 nm, the reproducing layer 1 was formed of $Gd_{0.31}(Fe_{0.80}Co_{0.20})_{0.69}$ with a thickness of 18 nm, and the third in-plane magnetized layer 11 was formed of GdFeCoAl with a modulated composition in the direction of layer thickness, with a thickness of 20 nm.

Next, in the same manner as in Example 5 above, the non-magnetic intermediate layer 13 was formed of AlN with a thickness of 20 nm, the reflective layer 14 was formed of $Al_{0.90}Ti_{0.10}$ with a thickness of 15 nm, the recording layer 4 was formed of $Tb_{0.22}(Fe_{0.82}Co_{0.18})_{0.78}$ with a thickness of 40 nm, the protective layer 9 was formed of AlN with a thickness of 20 nm, and the overcoat layer 10 was formed.

(2) Recording and Reproducing Characteristics

Using an optical pickup equipped with a semiconductor laser of 680 nm wavelength, CNR on the lands of the foregoing magneto-optical disk was measured. Here, recording was performed by the magnetic field modulation recording method. While rotating the foregoing magneto-optical disk at a line speed of 2.5 m/sec, recording was performed by continuously projecting a laser power of 6.2 mW onto the magneto-optical disk and applying a recording magnetic field of ±1.975×10⁴ A/m modulated at a frequency of 4 MHz.

Further, in reproducing, laser power was adjusted so as to obtain the largest CNR possible. With the ultra-high resolution magneto-optical disk according to the present Example, a reproducing laser power of 2.1 mW was used.

For purposes of comparison, an ultra-high resolution magneto-optical disk was prepared, as Comparative Example 6, in the same manner as the present Example, except that the reflective layer 14 was omitted. Comparative Example 6 was also measured in the same way as noted above.

In the foregoing measurement, Comparative Example 6 yielded a CNR of 39.0 dB, while the present Example yielded a CNR of 40.5 dB. Accordingly, the present Example was found to have an increase in CNR of 1.5 dB over Comparative Example 6.

Further, after recording on the lands of the magneto-optical disks according to the present Example and Comparative Example 6 in the same way as above, the laser light was moved to an adjacent groove, and crosstalk from information recorded on the lands was measured. In this measurement, Comparative Example 6 yielded crosstalk of 16.0 dB, while the present Example yielded crosstalk of 9.5 dB. In other words, in the present Example, a reduction in crosstalk of 6.5 dB was found.

The present Example used a reproducing layer 1 of $Gd_{0.31}(Fe_{0.80}Co_{0.20})_{0.69}$, a third in-plane magnetized layer 11 of a composition-modulated film with a TM-rich composition of GdFeCoAl, and a recording layer 4 of $Tb_{0.22}(Fe_{0.82}Co_{0.18})_{0.78}$, but these layers are not limited to these respective compositions.

It is sufficient if the reproducing layer 1 has magnetic characteristics whereby it shifts from in-plane to perpendicular magnetization at a temperature within a range from 100° C. through 200° C. It is also possible to use for the third in-plane magnetized layer 11 an in-plane magnetized film of an RE-rich composition. Further, magnetization of the recording layer 4 increases as temperature increases from room temperature, and it is preferable if the recording layer 4 has a compensation temperature in the vicinity of room temperature, so that the recording layer 4 has maximum magnetization in the vicinity of the temperature at which the reproducing layer has perpendicular magnetization.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations, provided such variations do not depart from the spirit of the present invention or exceed the scope of the patent claims set forth below.

What is claimed is:

1. A magneto-optical recording medium comprising:
    a reproducing layer having in-plane magnetization at room temperature and shifting to have perpendicular magnetization at temperatures at and above a critical temperature;
    an in-plane magnetized layer made of an in-plane magnetized film; and
    a recording layer made of a perpendicularly magnetized film, provided in that order,
        wherein said in-plane magnetized layer has a Curie temperature in the vicinity of the critical temperature at or near an interface with said reproducing layer, and has a Curie temperature at or near an interface with said recording layer which is higher than the Curie temperature at or near the interface with said reproducing layer.

2. The magneto-optical recording medium set forth in claim 1,
    wherein said in-plane magnetized layer includes a first in-plane magnetized layer having a Curie temperature in the vicinity of the critical temperature, and a second in-plane magnetized layer having a Curie temperature higher than that of said first in-plane magnetized layer, and
        wherein said first in-plane magnetized layer is provided toward said reproducing layer, and said second in-plane magnetized layer is provided toward said recording layer.

3. The magneto-optical recording medium set forth in claim 1,
    wherein Curie temperature of said in-plane magnetized layer changes continuously in a direction of layer thickness, such that Curie temperature at the interface with said recording layer is higher than Curie temperature at the interface with said reproducing layer.

4. The magneto-optical recording medium set forth in claim 2, further comprising:
    a non-magnetic intermediate layer made of a non-magnetic film, provided between said in-plane magnetized layer and said recording layer.

5. The magneto-optical recording medium set forth in claim 3, further comprising:
    a non-magnetic intermediate layer made of a non-magnetic film, provided between said in-plane magnetized layer and said recording layer.

6. The magneto-optical recording medium set forth in claim 4, wherein:
    a reflective layer is further provided between said non-magnetic intermediate layer and said recording layer; and
    said non-magnetic intermediate layer is transparent.

7. The magneto-optical recording medium set forth in claim 5, wherein:
    a reflective layer is further provided between said non-magnetic intermediate layer and said recording layer; and
    said non-magnetic intermediate layer is transparent.

8. The magneto-optical recording medium set forth in claim 2, wherein:
    said reproducing layer is made of an alloy chiefly comprising a rare earth-transition metal alloy.

9. The magneto-optical recording medium set forth in claim 3, wherein:
    said reproducing layer is made of an alloy chiefly comprising a rare earth-transition metal alloy.

10. The magneto-optical recording medium set forth in claim 2, wherein:
    said reproducing layer is made of a rare earth-transition metal alloy in which, in a temperature range at which reproducing is performed, moment of a rare earth metal sub-lattice is larger than moment of a transition metal sub-lattice.

11. The magneto-optical recording medium set forth in claim 3, wherein:
    said reproducing layer is made of a rare earth-transition metal alloy in which, in a temperature range at which reproducing is performed, moment of a rare earth metal sub-lattice is larger than moment of a transition metal sub-lattice.

12. The magneto-optical recording medium set forth in claim 2, wherein:
said recording layer is made of an alloy containing a rare earth-transition metal alloy having a compensation temperature at room temperature.

13. The magneto-optical recording medium set forth in claim 3, wherein:
said recording layer is made of an alloy containing a rare earth-transition metal alloy having a compensation temperature at room temperature.

14. The magneto-optical recording medium set forth in claim 2, wherein:
said first in-plane magnetized layer is made of an alloy film chiefly comprising a rare earth-transition metal alloy.

15. The magneto-optical recording medium set forth in claim 2, wherein:
said first in-plane magnetized layer is made of an alloy film containing at least one of a non-magnetic metal and a light rare earth metal.

16. The magneto-optical recording medium set forth in claim 2, wherein:
said second in-plane magnetized layer is made of an alloy film chiefly comprising a rare earth-transition metal alloy.

17. The magneto-optical recording medium set forth in claim 2, wherein:
said second in-plane magnetized layer is made of an alloy film containing at least one of a non-magnetic metal and a light rare earth metal.

18. The magneto-optical recording medium set forth in claim 3, wherein:
said in-plane magnetized layer is made of an alloy film chiefly comprising a rare earth-transition metal alloy.

19. The magneto-optical recording medium set forth in claim 3, wherein:
said in-plane magnetized layer is made of an alloy film containing at least one of a non-magnetic metal and a light rare earth metal.

20. The magneto-optical recording medium set forth in claim 2, further comprising:
a recording auxiliary layer made of a perpendicularly magnetized film having a higher Curie temperature and smaller coercive force than said recording layer, provided in contact with said recording layer.

21. The magneto-optical recording medium set forth in claim 3, further comprising:
a recording auxiliary layer made of a perpendicularly magnetized film having a higher Curie temperature and smaller coercive force than said recording layer, provided in contact with said recording layer.

22. The magneto-optical recording medium set forth in claim 2, further comprising:
a transparent dielectric layer, provided on an opposite surface of said reproducing layer from a surface thereof which faces said first in-plane magnetized layer.

23. The magneto-optical recording medium set forth in claim 3, further comprising:
a transparent dielectric layer, provided on an opposite surface of said reproducing layer from a surface thereof which faces said in-plane magnetized layer.

24. The magneto-optical recording medium set forth in claim 2, further comprising:
a protective layer containing at least one of a transparent dielectric body and a non-magnetic alloy material, provided on an opposite surface of said recording layer from a surface thereof which faces said second in-plane magnetized layer.

25. The magneto-optical recording medium set forth in claim 3, further comprising:
a protective layer containing at least one of a transparent dielectric body and a non-magnetic alloy material, provided on an opposite surface of said recording layer from a surface thereof which faces said in-plane magnetized layer.

26. The magneto-optical recording medium set forth in claim 24, further comprising:
an overcoat layer made of a resin material, provided on an opposite surface of said protective layer from a surface thereof which faces said recording layer.

27. The magneto-optical recording medium set forth in claim 25, further comprising:
an overcoat layer made of a resin material, provided on an opposite surface of said protective layer from a surface thereof which faces said recording layer.

28. The magneto-optical recording medium set forth in claim 26, further comprising:
a heat dissipating layer, provided between said protective layer and said overcoat layer.

29. The magneto-optical recording medium set forth in claim 27, further comprising:
a heat dissipating layer, provided between said protective layer and said overcoat layer.

30. The magneto-optical recording medium set forth in claim 1,
wherein in said reproducing layer, during reproduction a record bit is transferred onto a portion of a perpendicularly magnetized area alone, inside a light spot projection area.

31. The magneto-optical recording medium set forth in claim 2,
wherein in said reproducing layer, during reproduction a record bit is transferred onto a portion of a perpendicularly magnetized area alone, inside a light spot projection area.

32. The magneto-optical recording medium set forth in claim 3,
wherein in said reproducing layer, during reproduction a record bit is transferred onto a portion of a perpendicularly magnetized area alone, inside a light spot projection area.

33. The magneto-optical recording medium set forth in claim 1, further comprising:
a non-magnetic intermediate layer made of a non-magnetic film, provided between said in-plane magnetized layer and said recording layer.

34. The magneto-optical recording medium set forth in claim 1, wherein:
said reproducing layer is made of an alloy chiefly comprising a rare earth-transition metal alloy.

35. The magneto-optical recording medium set forth in claim 1, wherein:
said reproducing layer is made of a rare earth-transition metal alloy in which, in a temperature range at which reproducing is performed, moment of a rare earth metal sub-lattice is larger than moment of a transition metal sub-lattice.

36. The magneto-optical recording medium set forth in claim 1, wherein:
said recording layer is made of an alloy containing a rare earth-transition metal alloy having a compensation temperature at room temperature.

37. The magneto-optical recording medium set forth in claim 1, further comprising:
a recording auxiliary layer made of a perpendicularly magnetized film having a higher Curie temperature and smaller coercive force than said recording layer, provided in contact with said recording layer.

* * * * *